(12) United States Patent
Hooker et al.

(10) Patent No.: US 8,645,631 B2
(45) Date of Patent: Feb. 4, 2014

(54) COMBINED L2 CACHE AND L1D CACHE PREFETCHER

(75) Inventors: Rodney E. Hooker, Austin, TX (US);
John Michael Greer, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 588 days.

(21) Appl. No.: 13/033,809

(22) Filed: Feb. 24, 2011

(65) Prior Publication Data

US 2011/0238923 A1    Sep. 29, 2011

Related U.S. Application Data

(60) Provisional application No. 61/318,594, filed on Mar. 29, 2010.

(51) Int. Cl.
*G06F 12/00* (2006.01)
(52) U.S. Cl.
USPC ............... 711/137; 711/122; 711/E12.057
(58) Field of Classification Search
None
See application file for complete search history.

(56) References Cited

U.S. PATENT DOCUMENTS

| | | | |
|---|---|---|---|
| 5,003,471 A | | 3/1991 | Gibson |
| 5,023,776 A | * | 6/1991 | Gregor ........................ 711/122 |
| 2003/0191901 A1 | * | 10/2003 | Hill et al. .................... 711/137 |
| 2005/0223175 A1 | | 10/2005 | Hepner et al. |
| 2007/0043908 A1 | | 2/2007 | Diefendorff |
| 2009/0006762 A1 | | 1/2009 | Gara et al. |
| 2009/0138661 A1 | | 5/2009 | Lauterbach |
| 2009/0198909 A1 | | 8/2009 | Speight et al. |
| 2010/0030973 A1 | | 2/2010 | Speight et al. |
| 2010/0095070 A1 | * | 4/2010 | Okawara et al. .............. 711/137 |
| 2011/0161587 A1 | * | 6/2011 | Guthrie et al. ............... 711/122 |
| 2011/0238920 A1 | | 9/2011 | Hooker et al. |
| 2011/0238922 A1 | | 9/2011 | Hooker et al. |
| 2011/0264860 A1 | | 10/2011 | Hooker et al. |

OTHER PUBLICATIONS

Edmund Preiss. "Intel® Core™ Microarchitecture." EMEA Software Solutions Group. Downloaded from http://www.polyhedron.com/web_images/documents/MicroArchitecture.pdf on Dec. 22, 2009. pp. 1-32.

* cited by examiner

*Primary Examiner* — Reginald Bragdon
*Assistant Examiner* — Baboucarr Faal
(74) *Attorney, Agent, or Firm* — E. Alan Davis; James W. Huffman

(57) ABSTRACT

A microprocessor includes a first-level cache memory, a second-level cache memory, and a data prefetcher that detects a predominant direction and pattern of recent memory accesses presented to the second-level cache memory and prefetches cache lines into the second-level cache memory based on the predominant direction and pattern. The data prefetcher also receives from the first-level cache memory an address of a memory access received by the first-level cache memory, wherein the address implicates a cache line. The data prefetcher also determines one or more cache lines indicated by the pattern beyond the implicated cache line in the predominant direction. The data prefetcher also causes the one or more cache lines to be prefetched into the first-level cache memory.

29 Claims, 19 Drawing Sheets

FIG. 7
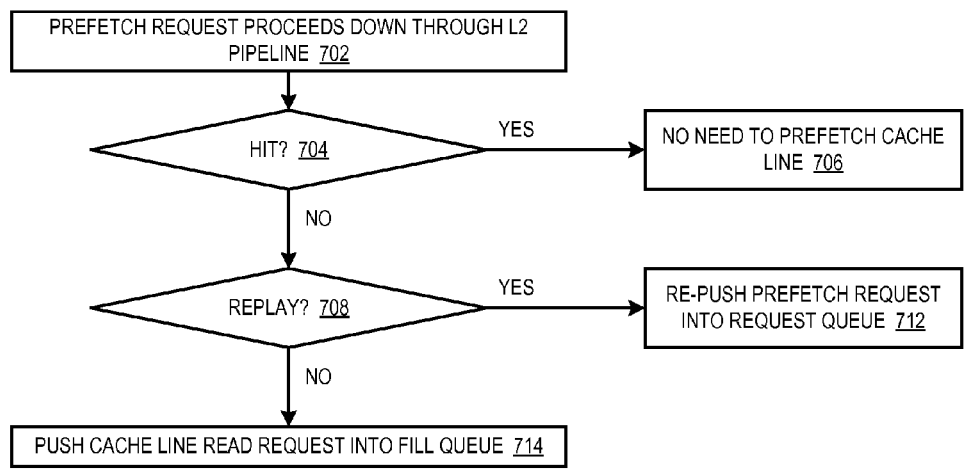
FIG. 8
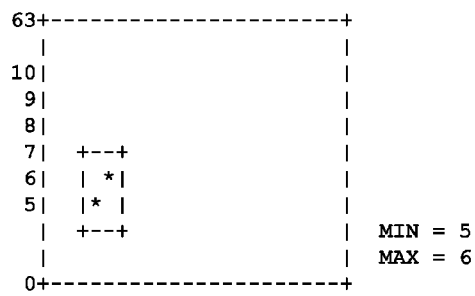
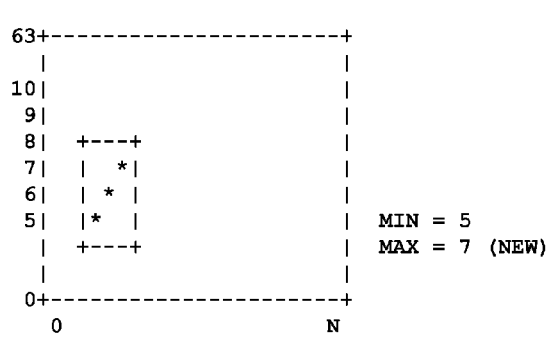

FIG. 9

SEQUENCE OF ACCESSES TO CACHE LINES IN MEMORY BLOCK AND UPDATES TO BLOCK BIT MASK:

```
ADDR 4DCED300
+----------------------------------------------------------------+
|            *                                                   |
+----------------------------------------------------------------+
             M
CNTR_MIN_CHANGE 1 *
CNTR_MAX_CHANGE 1 *
CNTR_TOTAL      1

ADDR 4DCED260
+----------------------------------------------------------------+
|          *  *                                                  |
+----------------------------------------------------------------+
             M
CNTR_MIN_CHANGE 2 *
CNTR_MAX_CHANGE 1
CNTR_TOTAL      2

...

ADDR 4DCED6C0
+----------------------------------------------------------------+
| * *  * *  * *  * *  *     *                                    |
+----------------------------------------------------------------+
             M
CNTR_MIN_CHANGE 4
CNTR_MAX_CHANGE 5 *
CNTR_TOTAL      10
```

PERIOD MATCH COUNTER GENERATION:

```
CNTR_PERIOD_1_MATCHES
CNTR_PERIOD_2_MATCHES
CNTR_PERIOD_3_MATCHES 2
CNTR_PERIOD_4_MATCHES
CNTR_PERIOD_5_MATCHES 4 *

PERIOD 3 LEFT  OF MIDDLE |* *|
PERIOD 3 RIGHT OF MIDDLE |  *|
PERIOD 4 LEFT  OF MIDDLE | * *|
PERIOD 4 RIGHT OF MIDDLE | *  |
PERIOD 5 LEFT  OF MIDDLE | * *|
PERIOD 5 RIGHT OF MIDDLE | * *|
```

*FIG. 10*

```
ADDR 4DCED760

+------------------------------------------------------------------+
|  * *  * *  * *  * *  * *  * *                                    |
+------------------------------------------------------------------+
                  M
PERIOD 3 LEFT  OF MIDDLE | * |
PERIOD 3 RIGHT OF MIDDLE | * |
PERIOD 4 LEFT  OF MIDDLE |* * |
PERIOD 4 RIGHT OF MIDDLE | * *|
PERIOD 5 LEFT  OF MIDDLE | * * |
PERIOD 5 RIGHT OF MIDDLE | * * |
CNTR_MIN_CHANGE 4
CNTR_MAX_CHANGE 6 *
CNTR_TOTAL      12
CNTR_PERIOD_1_MATCHES
CNTR_PERIOD_2_MATCHES
CNTR_PERIOD_3_MATCHES 3 *
CNTR_PERIOD_4_MATCHES
CNTR_PERIOD_5_MATCHES 5 *

+------------------------------------------------------------------+
|  * *  * *  * *  * *  * *  * *                                    |
+------------------------------------------------------------------+
            LLLLLRRRRR|
                 SEARCH POINTER
```

FIG. 11A

```
          +-----------------------------------------------------------+
   CLK0:  |  * *  * *  * *  * *  * *  * *                             |
          +---------------------|-------------------------------------+
                                > * * <  PATTERN INDICATES THIS LINE WILL NOT
                                         BE NEEDED

+-----------------------------------------------------------+
   CLK1:  |  * *  * *  * *  * *  * *  * *                             |
          +-------------------------|---------------------------------+
                                    > * * <  PATTERN INDICATES THIS LINE WILL BE
                                             NEEDED BUT HAS ALREADY BEEN FETCHED

+-----------------------------------------------------------+
   CLK2:  |  * *  * *  * *  * *  * *  * *                             |
          +-----------------------|-----------------------------------+
                                  > * * <  PATTERN INDICATES THIS LINE WILL NOT
                                           BE NEEDED

+-----------------------------------------------------------+
   CLK3:  |  * *  * *  * *  * *  * *  * *                             |
          +---------------------------|-------------------------------+
                                      > * * <  PATTERN INDICATES THIS LINE WILL BE
                                               NEEDED BUT HAS ALREADY BEEN FETCHED

+-----------------------------------------------------------+
   CLK4:  |  * *  * *  * *  * *  * *  * *                             |
          +-------------------------------|---------------------------+
                                          > * * <  PATTERN INDICATES THIS LINE WILL NOT
                                                   BE NEEDED

+-----------------------------------------------------------+
   CLK5:  |  * *  * *  * *  * *  * *  * *                             |
          +------------------------------|----------------------------+
                                         > * * <  PATTERN INDICATES THIS LINE WILL
                                                  NOT BE NEEDED

+-----------------------------------------------------------+
   CLK6:  |  * *  * *  * *  * *  * *  * *                             |
          +-----------------------------|-----------------------------+
                                        > * * <  PATTERN INDICATES THIS LINE WILL
                                                 BE NEEDED BUT HAS ALREADY BEEN
                                                 FETCHED

+-----------------------------------------------------------+
   CLK7:  |  * *  * *  * *  * *  * *  * *                             |
          +-------------------------|---------------------------------+
                                    > * * <  PATTERN INDICATES THIS LINE WILL
                                             NOT BE NEEDED
```

FIG. 11B

```
         +---------------------------------------------------------------+
CLK8:    |  * *  * *  * *  * *  * *  * *                                 |
         +------------------------------|--------------------------------+
                                        > * * <  PATTERN INDICATES THIS LINE WILL
                                                 BE NEEDED BUT HAS ALREADY BEEN
                                                 FETCHED

+---------------------------------------------------------------+
CLK9:    |  * *  * *  * *  * *  * *  * *                                 |
         +------------------------------|--------------------------------+
                                        > * * <  PATTERN INDICATES THIS LINE WILL
                                                 NOT BE NEEDED

+---------------------------------------------------------------+
CLK10:   |  * *  * *  * *  * *  * *  * *                                 |
         +--------------------------------|------------------------------+
                                          > * * <  PATTERN INDICATES THIS LINE
                                                   WILL NOT BE NEEDED

+---------------------------------------------------------------+
CLK11:   |  * *  * *  * *  * *  * *  * *                                 |
         +-------------------------------|-------------------------------+
                                         > * * <  PATTERN INDICATES THIS LINE
                                                  WILL BE NEEDED AND HAS NOT
                                                  BEEN FETCHED
```

COMBINED L2 CACHE AND L1D CACHE PREFETCHER

CROSS REFERENCE TO RELATED APPLICATION(S)

This application claims priority based on U.S. Provisional Application Ser. No. 61/318,594, filed Mar. 29, 2010, entitled BOUNDING BOX PREFETCHER, which is hereby incorporated by reference in its entirety.

This application is related to the following co-pending U.S. Patent Applications which are concurrently filed herewith, each of which is incorporated by reference herein for all purposes.

| Ser. No. | Title |
| --- | --- |
| 13/033,765 | BOUNDING BOX PREFETCHER |
| 13/033,848 | BOUNDING BOX PREFETCHER WITH REDUCED WARM-UP PENALTY ON MEMORY BLOCK CROSSINGS |

FIELD OF THE INVENTION

The present invention relates in general to the field of cache memories in a microprocessor, and particularly to data prefetching into same.

BACKGROUND OF THE INVENTION

In current systems, in the event of a cache miss, the time required for a microprocessor to access system memory can be one or two orders of magnitude more than the time required to access the cache memory. For this reason, to improve their cache hit rate, microprocessors incorporate prefetching techniques that examine recent data access patterns and attempt to predict which data the program will access next. The benefits of prefetching are well known.

However, the present inventors have observed that access patterns of some programs are not detected by conventional microprocessor prefetch units. For example, the graph shown in FIG. 1 illustrates the pattern of accesses presented to a level-2 (L2) cache memory while executing a program that includes a sequence of store operations through memory. The graph plots the memory address as a function of time. As may be observed from the graph, although there is a general trend over time of increasing memory addresses, i.e., in the upward direction, in many cases the memory address of a given access may be downward relative to its temporal predecessor rather than upward according to the general trend. This makes it highly unlikely that conventional prefetchers will prefetch effectively.

There are at least two reasons that the memory accesses presented to a cache memory of a microprocessor may, although exhibiting a general trend in one direction when viewed as a relatively large sample, appear chaotic when viewed in a small sample by a conventional prefetcher. The first reason is that the program accesses memory in this manner by its construction, whether by the nature of its algorithms or by poor programming. The second reason is that out-of-order execution microprocessor cores, by the normal function of their pipelines and queues when operating at capacity, often re-order the memory accesses differently than they were generated by the program.

Therefore, what is needed is a prefetcher that is capable of effectively prefetching data for programs that exhibit no clear trend when considering their memory accesses within relatively small time windows, but present a clear trend when examined in relatively large samples.

BRIEF SUMMARY OF INVENTION

In one aspect the present invention provides a microprocessor. The microprocessor includes a first-level cache memory, a second-level cache memory, and a data prefetcher configured to detect a predominant direction and pattern of recent memory accesses presented to the second-level cache memory and prefetch cache lines into the second-level cache memory based on the predominant direction and pattern. The data prefetcher is also configured to receive from the first-level cache memory an address of a memory access received by the first-level cache memory, wherein the address implicates a cache line. The data prefetcher is also configured to determine one or more cache lines indicated by the pattern beyond the implicated cache line in the predominant direction. The data prefetcher is also configured to cause the one or more cache lines to be prefetched into the first-level cache memory.

In another aspect, the present invention provides a method for prefetching data into a first-level cache memory of a microprocessor also having a second-level cache memory. The method includes detecting a predominant direction and pattern of recent memory accesses presented to the second-level cache memory and prefetching cache lines into the second-level cache memory based on the predominant direction and pattern. The method also includes receiving from the first-level cache memory an address of a memory access received by the first-level cache memory, wherein the address implicates a cache line. The method also includes determining one or more cache lines indicated by the pattern beyond the implicated cache line in the predominant direction. The method also includes causing the one or more cache lines to be prefetched into the first-level cache memory.

In yet another aspect, the present invention provides a computer program product encoded in at least one computer readable medium for use with a computing device, the computer program product comprising computer readable program code embodied in said medium, for specifying a microprocessor, the computer readable program code comprising first program code for specifying a first-level cache memory, second program code for specifying a second-level cache memory, and third program code for specifying a data prefetcher configured to detect a predominant direction and pattern of recent memory accesses presented to the second-level cache memory and prefetch cache lines into the second-level cache memory based on the predominant direction and pattern. The data prefetcher is also configured to receive from the first-level cache memory an address of a memory access received by the first-level cache memory, wherein the address implicates a cache line. The data prefetcher is also configured to determine one or more cache lines indicated by the pattern beyond the implicated cache line in the predominant direction. The data prefetcher is also configured to cause the one or more cache lines to be prefetched into the first-level cache memory.

BRIEF DESCRIPTION OF THE DRAWINGS

FIG. 7 is a flowchart illustrating operation of the prefetch request queue of FIG. 3.

FIG. 8 is two graphs plotting accesses to a memory block for use in illustrating the bounding box prefetcher of the present invention.

FIG. 9 is a block diagram illustrating operation of the microprocessor of FIG. 2 by example.

FIG. 10 is a block diagram illustrating further operation of the microprocessor of FIG. 2 continuing the example of FIG. 9.

FIG. 11 is a block diagram illustrating further operation of the microprocessor of FIG. 2 continuing the example of FIGS. 9 and 10.

DETAILED DESCRIPTION OF THE INVENTION

Bounding Box Prefetcher

Broadly speaking, the solution described herein to the problem described above may be explained as follows. If all accesses to memory were represented on a graph, the set of all accesses could be enclosed by a bounding box. If additional requests were represented on the same graph, those requests could also be enclosed by adjusting the size of the bounding box. In the first graph shown in FIG. 8, two accesses to a memory block are represented. The x-axis reflects the temporal order of the accesses. The y-axis represents the 64-byte cache line index within the 4 KB block of the access. Initially, the first two accesses are graphed: the first is to cache line 5, the second is to cache line 6. A box is drawn which encloses these two points.

Now, a third access occurs to cache line 7, and the box is grown to enclose the new point. As always with a new datapoint, the box must grow along the x-axis. However, the upper edge of the box also grows (upward in this case) along the y-axis. It is the movement of the lower and upper edges of the box that will be used to determine whether a pattern of accesses is trending upward, downward, or neither.

In addition to tracking the trends of the lower and upper edges of the bounding box in order to determine a direction trend, it is also necessary to track the individual accesses, since it is often the case that patterns of accesses skip one or more cache lines. Thus, in order to prevent wasting prefetches on cache lines that are likely to be skipped, once an upward or downward trend has been detected, the prefetcher uses additional criteria to determine which cache lines to prefetch. Because of the tendency of accesses to be reordered, the prefetcher represents the history of accesses with the temporal ordering aspect stripped away. This is done by marking bits in a bitmask, where each bit corresponds to one cacheline within a memory block. For each access that arrives to a particular block, the corresponding bit in the bitmask is set. Once a sufficient number of accesses have been made to the memory block, the prefetcher uses the bitmask, which has no indication of the temporal ordering of the accesses, to make prefetching decisions based on the large view of accesses to the entire block as described in detail below, rather than making prefetching decisions based on a very small view of accesses and strictly according to their occurrence in time as with conventional prefetchers.

Figure 1:
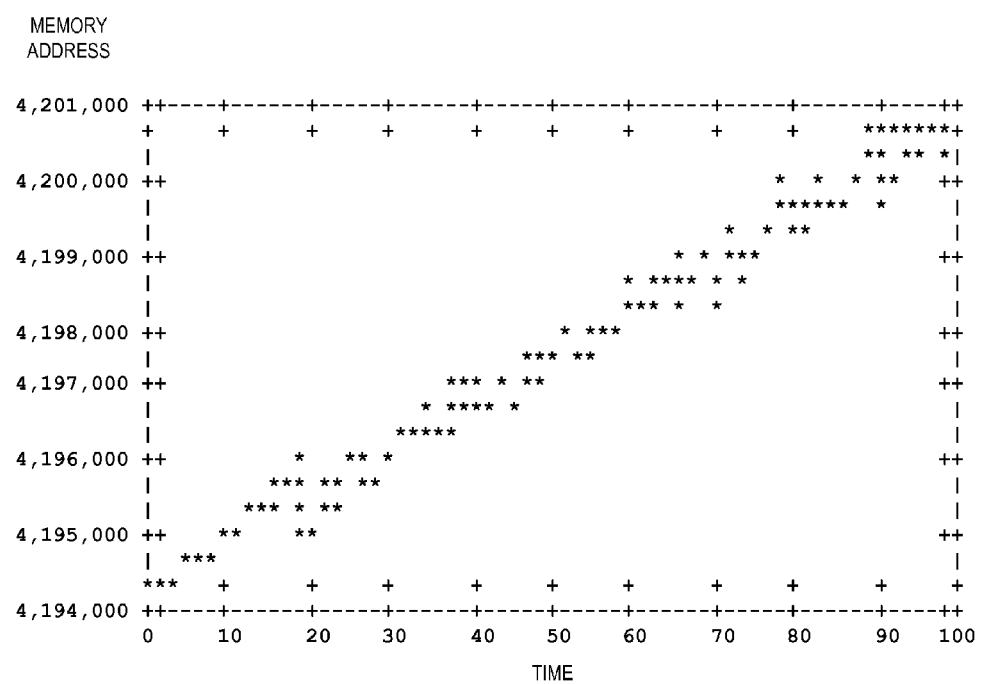
FIG. 1 is a graph that illustrates the pattern of accesses presented to a level-2 (L2) cache memory while executing a program that includes a sequence of store operations through memory.
Figure 2:
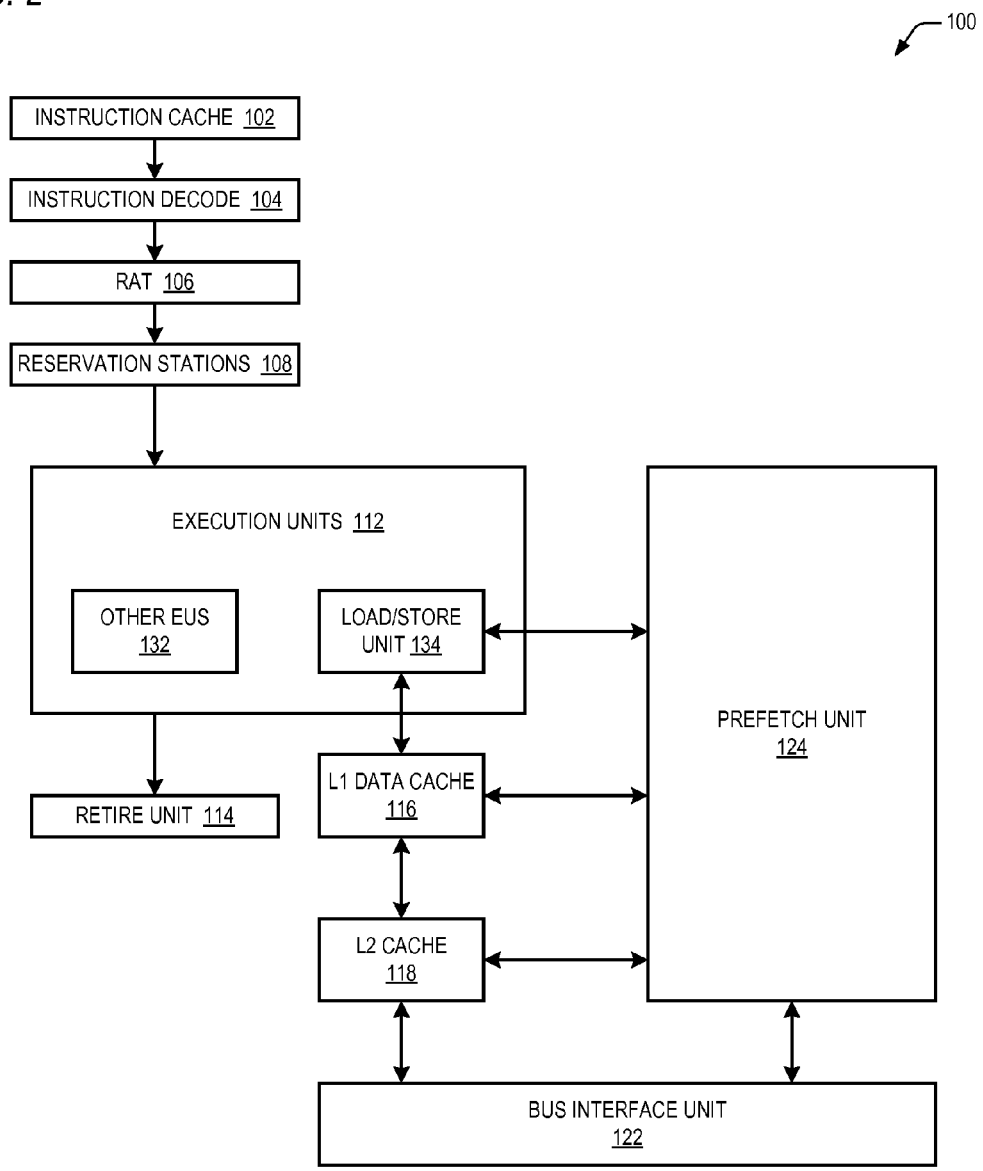
FIG. 2 is a block diagram illustrating a microprocessor according to the present invention.

Referring now to FIG. 2, a block diagram illustrating a microprocessor 100 according to the present invention is shown. The microprocessor 100 includes a pipeline of stages that includes various functional units. The pipeline includes an instruction cache 102, coupled to an instruction decoder 104, coupled to a register alias table (RAT) 106, coupled to reservation stations 108, coupled to execution units 112, coupled to a retire unit 114. The instruction decoder 104 may include an instruction translator that translates macroinstructions (e.g., of the x86 architecture) into microinstructions of the microinstruction set of a RISC-like microarchitecture of the microprocessor 100. The reservation stations 108 issue instructions to the execution units 112 for execution out of program order. The retire unit 114 includes a reorder buffer that enforces retirement of instructions in program order. The execution units 112 include a load/store unit 134 and other execution units 132, such as integer units, floating-point units, branch units, or SIMD units. The load/store unit 134 reads data from a level-1 (L1) data cache 116 and the store unit 134 writes data to the L1 data cache 116. A level-2 (L2) cache 118 backs the L1 data cache 116 and the instruction cache 102. The L2 cache 118 reads and writes system memory via a bus interface unit 122 that interfaces the microprocessor 100 to a bus, such as a local bus or memory bus. The microprocessor 100 also includes a prefetch unit 124 that prefetches data from system memory into the L2 cache 118 and/or the L1 data cache 116 as described in detail herein.

Figure 3:
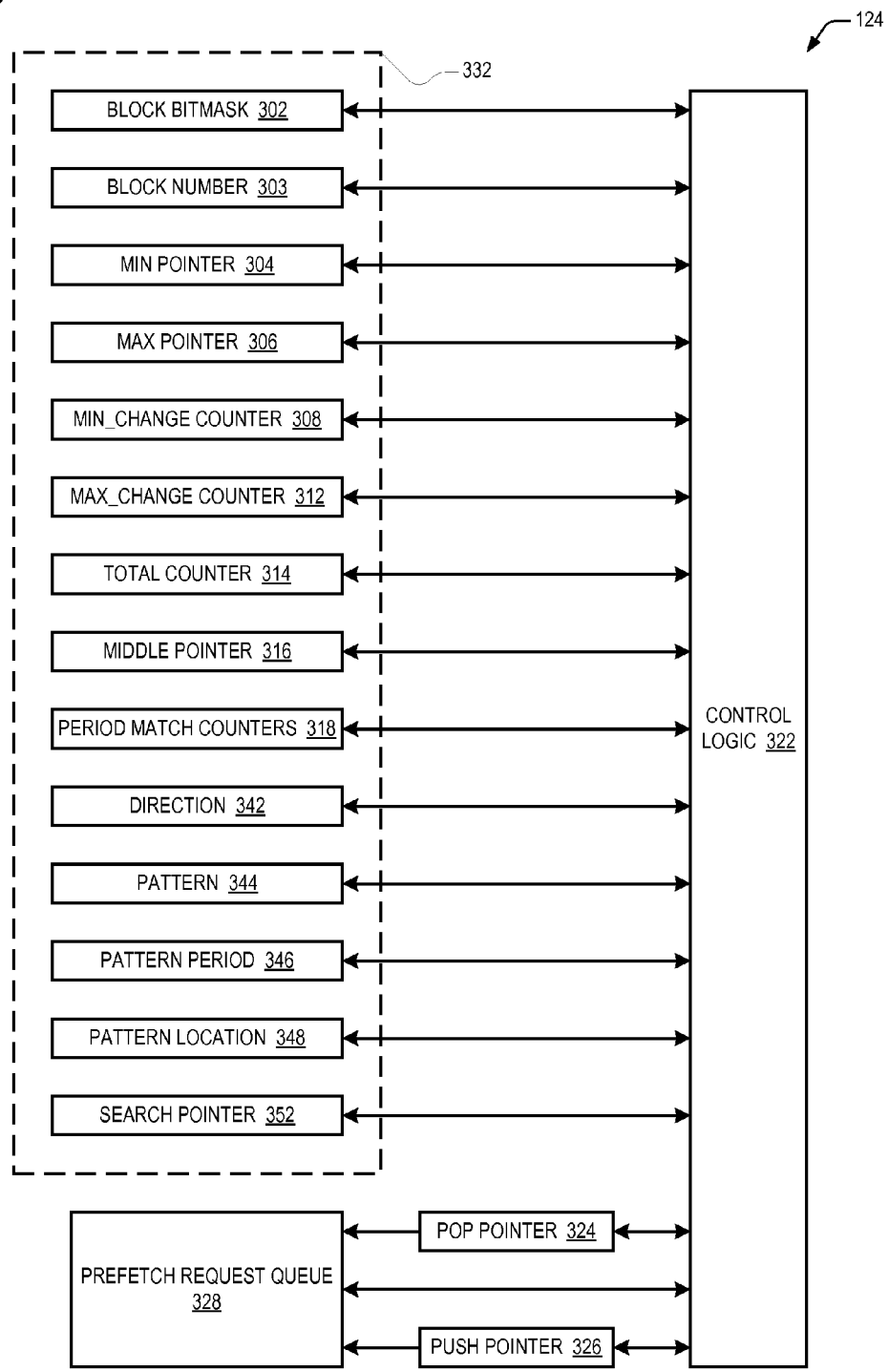
FIG. 3 is a block diagram illustrating in detail the prefetch unit of FIG. 2.

Referring now to FIG. 3, a block diagram illustrating in detail the prefetch unit 124 of FIG. 2 is shown. The prefetch unit 124 includes a block bitmask register 302. Each bit in the block bitmask 302 corresponds to one cacheline within a memory block whose block number is stored in a block number register 303. That is, the block number register 303 stores the upper address bits of the memory block. A true value of a bit in the block bitmask 302 indicates that the corresponding cache line has been accessed. The block bitmask 302 is initialized such that all bits are false. In one embodiment, the size of a memory block is 4 KB (which may in some instances equal the size of a physical memory page) and the size of a cache line is 64 bytes; thus, there are 64 bits in a block bitmask 302. However, the size of a cache line may vary in other embodiments. Furthermore, the size of the memory region over which the bitmask 302 is maintained may vary and does not necessarily correspond to the size of a physical memory page. Rather, the size of the memory region, or block, over which the bitmask 302 is maintained may be arbitrary (preferably a power of two), as long as it encompasses a sufficiently large number of cache lines to enable detection of a clear direction and pattern for beneficial prefetching purposes.

The prefetch unit 124 also includes a min pointer register 304 and a max pointer register 306 that are maintained to point to the lowest and highest cache line index, respectively, within the block that has been accessed since the prefetch unit 124 began tracking accesses to this memory block. The prefetch unit 124 also includes a min_change counter 308 and a max_change counter 312 that count the number of changes to the min pointer 304 and the max pointer 306, respectively, since the prefetch unit 124 began tracking accesses to this memory block. The prefetch unit 124 also includes a total counter 314 that counts the total number of cache lines accessed since the prefetch unit 124 began tracking accesses to this memory block. The prefetch unit 124 also includes a middle pointer 316 that points to the middle cache line index (i.e., the average of the min pointer 304 and max pointer 306) within the block that has been accessed since the prefetch unit 124 began tracking accesses to this memory block. The prefetch unit 124 also includes a direction register 342, a pattern register 344, a pattern period register 346, a pattern location register 348, and a search pointer register 352, whose uses are described in more detail below.

The prefetch unit 124 also includes a plurality of period match counters 318. Each of the period match counters 318 maintains a count for a different period. In one embodiment, the periods are 3, 4, and 5. The period is the number of bits to the left/right of the middle pointer 316. The period match counters 318 are updated after each memory access to the block. If the block bitmask 302 indicates that the accesses to the left of the middle pointer 316 over the period match the accesses to the right of the middle pointer 316 over the period, then the prefetch unit 124 increments the period match counter 318 associated with the period. The operation and use of the period match counters 318 are described in more detail below, particularly with respect to FIGS. 4 and 5.

The prefetch unit 124 also includes a prefetch request queue 328, a pop pointer 324, and a push pointer 326. The prefetch request queue 328 comprises a circular queue of entries each of which stores prefetch requests generated by the operation of the prefetch unit 124 as described herein, particularly with respect to FIGS. 4, 6 and 7. The push pointer 326 indicates the next entry to allocate in the prefetch request queue 328. The pop pointer 324 indicates the next entry to remove from the prefetch request queue 328. In one embodiment, because it is possible for prefetch requests to terminate out-of-order, the prefetch request queue 328 is capable of popping completed entries out-of-order. In one embodiment, the size of the prefetch request queue 328 is chosen to allow for full pipelining of requests into the L2 cache 118 tag pipeline such that the number of entries in the prefetch request queue 328 is at least as many as the number of stages in the L2 cache 118 pipeline. The prefetch requests are maintained until the end of the L2 cache 118 pipeline, at which point requests have one of three outcomes, as described in more detail with respect to FIG. 7, namely: a hit in the L2 cache 118, a replay, or a push of a fill queue entry to prefetch the desired data from system memory.

The prefetch unit 124 also includes control logic 322 that controls the elements of the prefetch unit 124 to perform the various functions described herein.

Although FIG. 3 illustrates only one set of the hardware 332 associated with one active memory block (the block bitmask 302, the block number 303, the min pointer 304, the max pointer 306, the min_change counter 308, the max_change counter 312, the total counter 314, the middle pointer 316, the period match counters 318, the direction register 342, the pattern register 344, the pattern period register 346, the pattern location register 348, and the search pointer register 352) the prefetch unit 124 includes a plurality of the hardware sets 332 shown in FIG. 3 in order to track accesses to multiple active memory blocks.

In one embodiment, the microprocessor 100 also includes one or more highly reactive prefetch units (not shown) that prefetch based on a much smaller temporal sample of accesses using different prefetch algorithms, and which work in conjunction with the prefetch unit 124 described herein. Because the prefetch unit 124 described herein analyzes a relatively larger number of memory accesses than the highly reactive prefetch units, it necessarily tends to take longer to commence prefetching from a new memory block, as described below, albeit likely more accurately than the highly reactive prefetch units. Thus, used conjunctively, the microprocessor 100 enjoys the benefits of the fast reaction time of the highly reactive prefetch units and the high accuracy of the prefetch unit 124 described herein. Additionally, the prefetch unit 124 may monitor requests from the other prefetch units and use those requests in its prefetch algorithm.

Figure 4:
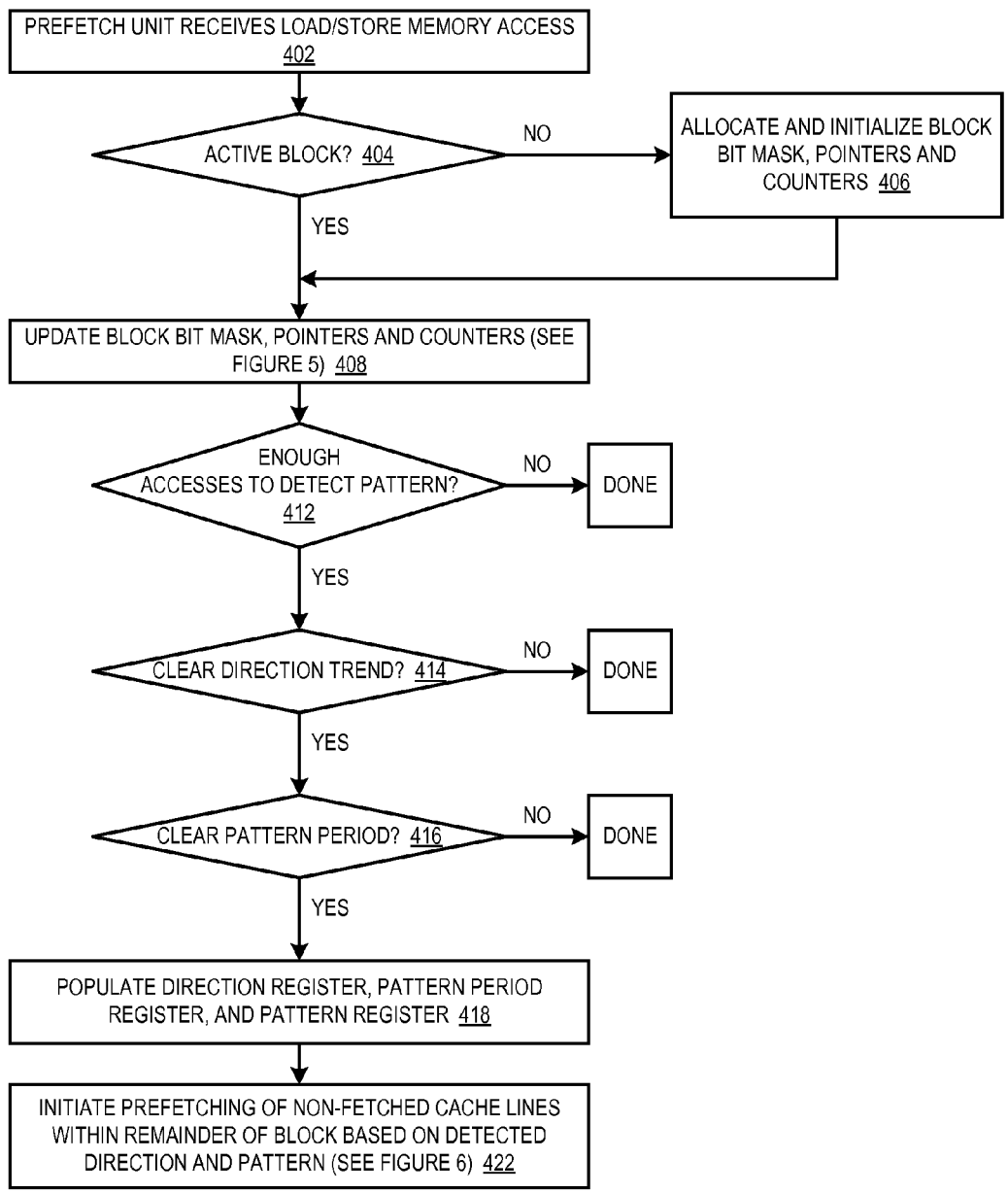
FIG. 4 is a flowchart illustrating operation of the microprocessor of FIG. 2, and in particular, the prefetch unit of FIG. 3.

Referring now to FIG. 4, a flowchart illustrating operation of the microprocessor 100 of FIG. 2, and in particular, the prefetch unit 124 of FIG. 3 is shown. Flow begins at block 402.

At block 402, the prefetch unit 124 receives a load/store memory access to a memory address. In one embodiment, the prefetch unit 124 distinguishes between loads and stores in determining which cache lines to prefetch; in another embodiment, the prefetch unit 124 does not distinguish between loads and stores in determining which cache lines to prefetch. In one embodiment, the prefetch unit 124 receives the memory access from the load/store unit 134. The prefetch unit 124 may receive the memory access from various sources including, but not limited to, the load/store unit 134, the L1 data cache 116 (e.g., an allocation request generated by the L1 data cache 116 as a result of a load/store unit 134 memory access that misses in the L1 data cache 116), and/or other sources such as other prefetch units (not shown) of the microprocessor 100 that employ different prefetch algorithms than the prefetch unit 124 to prefetch data. Flow proceeds to decision block 404.

At decision block 404, the control logic 322 determines whether the memory access is to an active block by comparing the memory access address with each block number register 303 value. That is, the control logic 322 determines whether a memory block hardware set 332 of FIG. 3 has been allocated for the memory block implicated by the memory address specified by the memory access. If so, flow proceeds to block 408; otherwise, flow proceeds to block 406.

At block 406, the control logic 322 allocates a hardware set 332 as shown in FIG. 3 for the implicated memory block. In one embodiment, the control logic 322 allocates the hardware sets 332 in a round-robin fashion. In another embodiment, the control logic 322 maintains least-recently-used information for the hardware sets 332 and allocates on a least-recentlyused basis. Additionally, the control logic 322 initializes the allocated hardware set 332. In particular, the control logic 322 clears all the bits of the block bitmask 302, populates the block number register 303 with the upper bits of the memory access address, and clears to zero the min pointer 304, max pointer 306, min_change counter 308, max_change counter 312, total counter 314, and period match counters 318. Flow proceeds to block 408.

Figure 5:
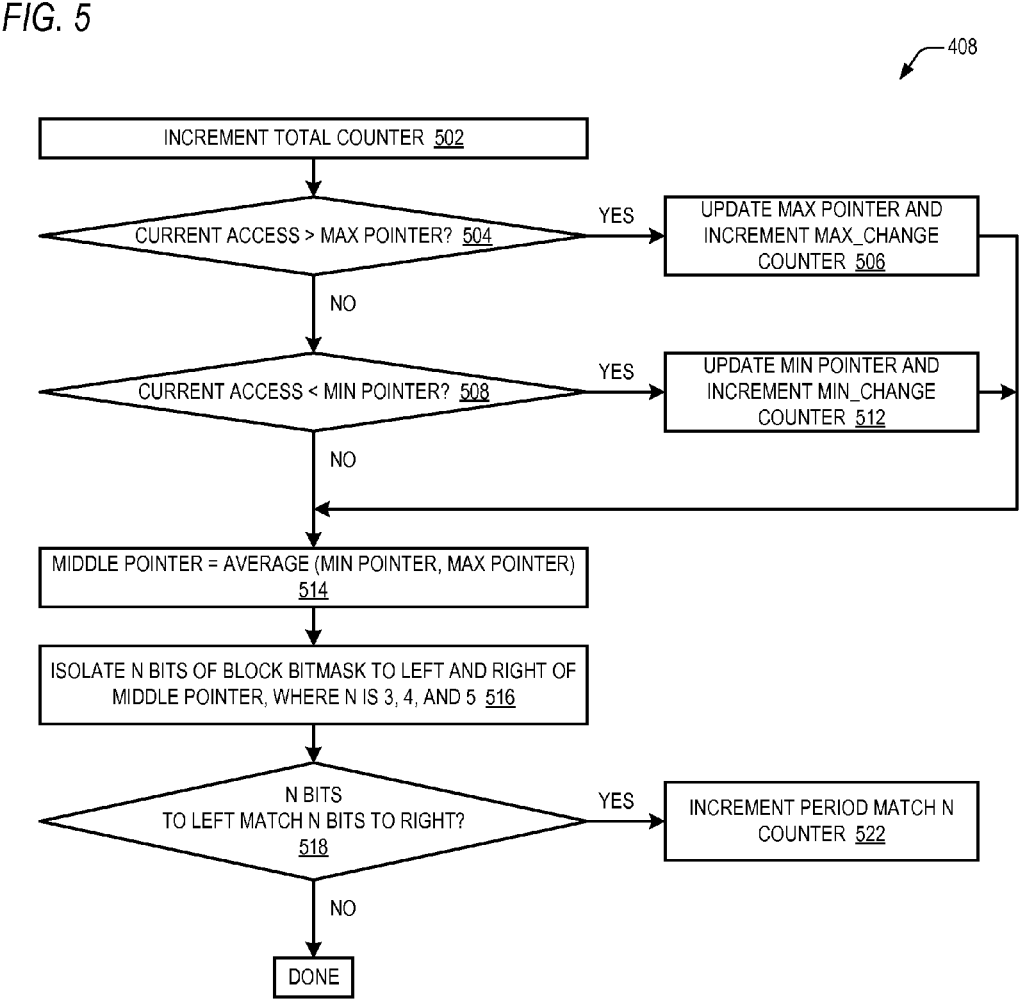
FIG. 5 is a flowchart illustrating operation of the prefetch unit of FIG. 3 to perform block of FIG. 4.

At block 408, the control logic 322 updates the hardware set 332 based on the memory access address as described in detail in FIG. 5. Flow proceeds to decision block 412.

At decision block 412, the control logic 322 examines the total counter 314 to determine whether the program has made enough accesses to the memory block to detect a pattern of accesses. In one embodiment, the control logic 322 determines whether the total counter 314 value is greater than a predetermined amount, which in one embodiment is ten, although the predetermined amount may vary. If enough accesses have been made, flow proceeds to decision block 414; otherwise, flow ends.

At decision block 414, the control logic 322 determines whether there is a clear direction trend among the accesses specified in the block bitmask 302. That is, the control logic 322 determines whether the accesses are clearly trending upward (increasing access addresses) or downward (decreasing access addresses). In one embodiment, the control logic 322 determines whether there is a clear direction trend by determining whether the difference between the min_change counter 308 and the max_change counter 312 is greater than a predetermined amount, which in one embodiment is two, although the predetermined amount may vary. If the min_change counter 308 is greater than the max_change counter 312 by the predetermined amount, then the clear trend is downward; whereas, if the max_change counter 312 is greater than the min_change counter 308 by the predetermined amount, then the clear trend is upward. If there is a clear direction trend, flow proceeds to decision block 416; otherwise, flow ends.

At block 416, the control logic 322 determines whether there is a clear pattern period winner among the accesses specified in the block bitmask 302. In one embodiment, the control logic 322 determines whether there is a clear pattern period winner by determining whether the difference between one of the period match counters 318 and all the other period match counters 318 is greater than a predetermined amount, which in one embodiment is two, although the predetermined amount may vary. The updating of the period match counters 318 is described in detail with respect to FIG. 5. If there is a clear pattern period winner, flow proceeds to block 418; otherwise, flow ends.

At block 418, the control logic 322 populates the direction register 342 to indicate the clear direction trend determined at decision block 414. Additionally, the control logic 322 populates the pattern period register 346 with the clear winning pattern period (N) detected at decision block 416. Finally, the control logic 322 populates the pattern register 344 with the clearly winning pattern detected at decision block 416. That is, the control logic 322 populates the pattern register 344 with the N bits of the block bitmask 302 to the right or left of the middle pointer 316 (which will match, according to block 518 described below with respect to FIG. 5). Flow proceeds to block 422.

Figure 6:
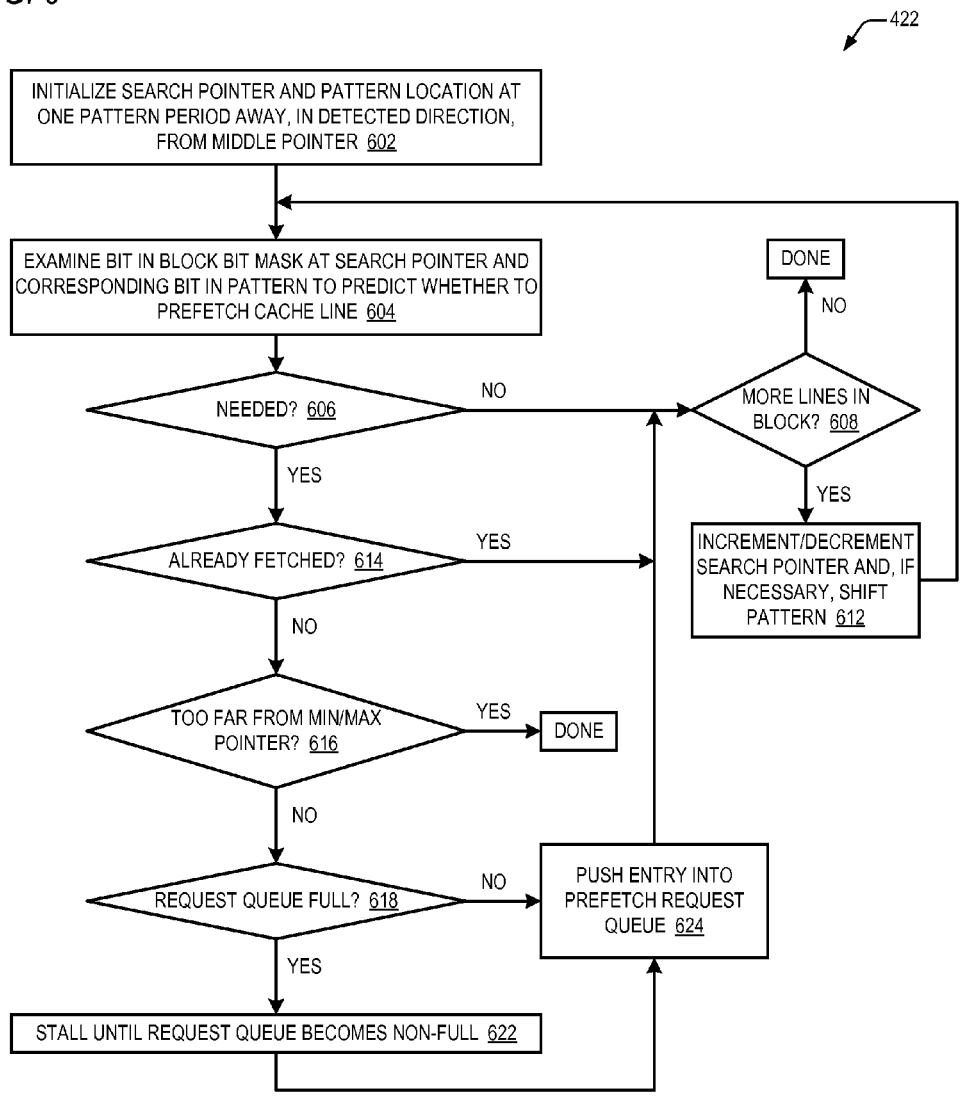
FIG. 6 is a flowchart illustrating operation of the prefetch unit of FIG. 3 to perform block of FIG. 4.

At block 422, the control logic 322 initiates prefetching of non-fetched cache lines within the memory block as described in detail with respect to FIG. 6 based on the detected direction and pattern. Flow ends at block 422.

Referring now to FIG. 5, a flowchart illustrating operation of the prefetch unit 124 of FIG. 3 to perform block 408 of FIG. 4 is shown. Flow begins at block 502.

At block 502, the control logic 322 increments the total counter 314. Flow proceeds to decision block 504.

At decision block 504, the control logic 322 determines whether the current memory access address—more specifically, the index within the memory block of the cache line implicated by the current memory access address—is greater than the max pointer 306 value. If so, flow proceeds to block 506; otherwise, flow proceeds to decision block 508.

At block 506, the control logic 322 updates the max pointer 306 with the index within the memory block of the cache line implicated by the current memory access address and increments the max_change counter 312. Flow proceeds to block 514.

At decision block 508, the control logic 322 determines whether the index within the memory block of the cache line implicated by the current memory access address is less than the min pointer 304 value. If so, flow proceeds to block 512; otherwise, flow proceeds to block 514.

At block 512, the control logic 322 updates the min pointer 304 with the index within the memory block of the cache line implicated by the current memory access address and increments the min_change counter 308. Flow proceeds to block 514.

At block 514, the control logic 322 computes the average of the min pointer 304 and max pointer 306 and updates the middle pointer 316 with the computed average. Flow proceeds to block 516.

At block 516, the control logic 322 examines the block bitmask 302 and isolates the N bits to the left and right of the middle pointer 316, where N is the number of bits associated with each of the respective period match counters 318. Flow proceeds to decision block 518.

At decision block 518, the control logic 322 determines whether the N bits to the left of the middle pointer 316 match the N bits to the right of the middle pointer 316. If so, flow proceeds to block 522; otherwise, flow ends.

At block 522, the control logic 322 increments the associated period match counter 318 having a period N. Flow ends at block 522.

Referring now to FIG. 6, a flowchart illustrating operation of the prefetch unit 124 of FIG. 3 to perform block 422 of FIG. 4 is shown. Flow begins at block 602.

At block 602, the control logic 322 initializes the search pointer 352 and pattern location 348 at one pattern period 346 away from the middle pointer 316 in the detected direction. That is, the control logic 322 initializes the search pointer 352 and pattern location 348 to the sum/difference of the middle pointer 316 value and the period (N) value of the detected pattern. For example, if the middle pointer 316 value is 16 and N is five and the direction 342 is upward, then the control logic 322 initializes the search pointer 352 and pattern location 348 to 21. Thus, in this example, the five bits of the pattern 344 would be located against bits 21 through 25 of the block bitmask 302 for comparison purposes, as described below. Flow proceeds to block 604.

At block 604, the control logic 322 examines the bit in the block bitmask 302 at the search pointer 342 and the corresponding bit in the pattern 344 (which is located against the block bitmask 302 at the pattern location 348) to predict whether to prefetch the corresponding cache line within the memory block. Flow proceeds to decision block 606.

At decision block 606, the control logic 322 predicts whether the examined cache line is needed. The control logic 322 predicts the cache line is needed if the bit in the pattern 344 is true, i.e., the pattern predicts the program will access the cache line. If the cache line is needed, flow proceeds to decision block 614; otherwise, flow proceeds to decision block 608.

At decision block 608, the control logic 322 determines whether there are any more unexamined cache lines in the memory block by determining whether the search pointer 342 has reached an end of the block bitmask 302. If there are no more cache lines, flow ends; otherwise, flow proceeds to block 612.

At block 612, the control logic 322 increments/decrements the search pointer 342. Additionally, if the search pointer 342 has passed beyond the last bit of the pattern 344, the control logic 322 updates the pattern location 348 with the new value of the search pointer 342, i.e., shifts the pattern 344 to the new search pointer 342 location. Flow returns to block 604.

At block decision block 614, the control logic 322 determines whether the needed cache line has already been fetched. The control logic 322 determines that the needed cache line has already been fetched if the bit in the block bitmask 302 is true. If the needed cache line has already been fetched, flow proceeds to decision block 608; otherwise, flow proceeds to decision block 616.

At decision block 616, the control logic 322 determines whether the cache line under consideration is more than a predetermined amount (which is sixteen in one embodiment) from the min pointer 304 if the direction 342 is downward or from the max pointer 306 if the direction 342 is upward. If so, flow ends; otherwise, flow proceeds to decision block 618. It is noted that if the cache line is too far away from the min pointer 304/max pointer 306 such that flow ends, this does not mean that the prefetch unit 124 will not subsequently prefetch additional cache lines within the block, since a subsequent access to a cache line within the block may trigger more prefetching within the block according to the steps of FIG. 4.

At decision block 618, the control logic 322 determines whether the prefetch request queue 328 is full. If so, flow proceeds to block 622; otherwise, flow proceeds to block 624.

At block 622, the control logic 322 stalls until the prefetch request queue 328 becomes non-full. Flow proceeds to block 624.

At block 624, the control logic 322 pushes an entry into the prefetch request queue 328 to prefetch the cache line. Flow proceeds to decision block 608.

Referring now to FIG. 7, a flowchart illustrating operation of the prefetch request queue 328 of FIG. 3 is shown. Flow begins at block 702.

At block 702, a prefetch request that was pushed into the prefetch request queue 328 at block 624 arbitrates for access to the L2 cache 118, is granted access, and proceeds down the L2 cache 118 pipeline. Flow proceeds to decision block 704.

At decision block 704, the L2 cache 118 determines whether the cache line address hit in the L2 cache 118. If so, flow proceeds to block 706; otherwise, flow proceeds to decision block 708.

At block 706, there is no need to prefetch the cache line since it is already in the L2 cache 118, and flow ends.

At decision block 708, the control logic 322 determines whether the response from the L2 cache 118 is that the request must be replayed. If so, flow proceeds to block 712; otherwise, flow proceeds to block 714.

At block 712, the request to prefetch the cache line is re-pushed into the prefetch request queue 328. Flow ends at block 712.

At block 714, the L2 cache 118 pushes a request into a fill queue (not shown) of the microprocessor 100 to request the bus interface unit 122 to read the cache line into the microprocessor 100. Flow ends at block 714.

Referring now to FIG. 9, a block diagram illustrating operation of the microprocessor 100 of FIG. 2 by example is shown. FIG. 9 illustrates the contents of the block bitmask 302 (an asterisk in a bit position indicates an access to the corresponding cache line), min_change counter 308, max_change counter 312, and total counter 314 after each of a first, second, and tenth accesses of a sequence of ten accesses to a memory block. In FIG. 9, the min_change counter 308 is referred to as "cntr_min_change," the max_change counter 312 is referred to as the "cntr_max_change," and the total counter 314 is referred to as the "cntr_total." The location of the middle pointer 316 is also indicated by an "M" in FIG. 9.

In response to the first access to address 0x4dced300 (block 402 of FIG. 4), which implicates the cache line at index 12 of the memory block, the control logic 322 sets bit 12 of the block bitmask 302 (block 408 of FIG. 4), as shown. Additionally, the control logic 322 updates the min_change counter 308, max_change counter 312, and total counter 314 (blocks 502, 506, and 512 of FIG. 5).

In response to the second access to address 0x4dced260, which implicates the cache line at index 9 of the memory block, the control logic 322 sets bit 9 of the block bitmask 302, as shown. Additionally, the control logic 322 updates the min_change counter 308 and total counter 314.

In response to the third through tenth accesses (the addresses of the third through ninth accesses are not shown, the address of the tenth access being 0x4dced6c0), the control logic 322 sets the appropriate bits of the block bitmask 302, as shown. Additionally, the control logic 322 updates the min_change counter 308, max_change counter 312, and total counter 314 in response to each access.

At the bottom of FIG. 9, the contents of the period match counters 318 is shown after the control logic 322 has performed the steps at blocks 514 through 522 after each of the ten accesses. In FIG. 9, the period match counters 318 are referred to as the "cntr_period_N matches," where N is 1, 2, 3, 4, or 5.

As may be observed in the example of FIG. 9, although the criteria at decision block 412 is met (total counter 314 is at least ten) and the criteria at decision block 416 is met (period match counter 318 for period 5 is at least two greater than all other period match counters 318), the criteria at decision block 414 is not met (difference between min_change counter 308 and max_change counter 312 is not at least two). Therefore, no prefetching is performed for the block at this time.

Also shown at the bottom of FIG. 9 are the patterns from the block bitmask 302 for the periods 3, 4, and 5 to the right and left of the middle pointer 316.

Referring now to FIG. 10, a block diagram illustrating further operation of the microprocessor 100 of FIG. 2 continuing the example of FIG. 9 is shown. FIG. 10 illustrates similar information as FIG. 9 but after eleventh and twelfth accesses to the memory block (the address of the twelfth access being 0x4dced760). As may be observed, the criteria at decision block 412 is met (total counter 314 is at least ten), the criteria at decision block 414 is met (difference between min_change counter 308 and max_change counter 312 is at least two), and the criteria at decision block 416 is met (period match counter 318 for period 5 is at least two greater than all other period match counters 318). Therefore, according to block 418 of FIG. 4, the control logic 322 populates the direction register 342 (to indicate an upward direction), populates the pattern period register 346 (with a value of 5), and populates the pattern register 344 (with a pattern of "* *" or "01010"); and, according to block 422 of FIG. 4 and FIG. 6, the control logic 322 performs prefetch predicting for the block, as described with respect to FIG. 11. FIG. 10 also shows the location of the search pointer 342 at bit 21, according to the operation of the control logic 322 at block 602 of FIG. 6.

Referring now to FIG. 11, a block diagram illustrating further operation of the microprocessor 100 of FIG. 2 continuing the example of FIGS. 9 and 10 is shown. FIG. 11 illustrates the operation of blocks 604 through 616 of FIG. 6 through each of twelve different instances (denoted 0 through 11) in the example until a cache line within the memory block is found that the prefetch unit 124 predicts needs to be prefetched. As shown, the search pointer 342 is incremented according to block 612 of FIG. 6 in each instance. As may also be observed from FIG. 11, at instances 5 and 10, the pattern location 348 is updated according to block 612 of FIG. 6. As shown, in instances 0, 2, 4, 5, 7, 9, and 10, the pattern indicates that the cache line at the search pointer 342 will not be needed because the bit at the search pointer 342 is false. Furthermore as shown, in instances 1, 3, 6, and 8, the pattern 344 indicates that the cache line at the search pointer 342 will be needed because the bit in the pattern 344 at the search pointer 342 is true, however the cache line has already been fetched as indicated by the bit in the block bitmask 302 being true. Finally as shown, in instance 11, the pattern 344 indicates that the cache line at the search pointer 342 will be needed because the bit in the pattern 344 at the search pointer 342 is true, and the cache line has not already been fetched as indicated by the bit in the block bitmask 302 being false. Therefore, the control logic 322 pushes a prefetch request into the prefetch request queue 328 according to block 624 of FIG. 6 to prefetch the cache line at address 0x4dced800, which corresponds to bit 32 in the block bitmask 302.

In one embodiment, one or more of the predetermined amounts described herein are programmable, either by the operating system (such as via a model specific register (MSR)) or via fuses of the microprocessor 100 that may be blown when the microprocessor 100 is manufactured.

In one embodiment, the size of the block bitmask 302 is reduced in order to save power and die real estate. That is, there are fewer bits in each block bitmask 302 than the number of cache lines in a block. For example, in one embodiment, each block bitmask 302 contains only half the number bits as the number of cache lines in a block. The half-block bitmask 302 tracks accesses to only either the upper or lower half of the block depending upon which half of the block was the first half accessed. An additional bit indicates whether the lower or upper half of the block was accessed first.

In one embodiment, instead of examining N-bits above and below the middle pointer 316 as at block 516/518, the control logic 322 includes a serial search engine that scans the entire block bitmask 302 thus far, one or two bits at a time, in order to find patterns having periods greater than the largest period (e.g., 5 bit as described above).

In one embodiment, if no clear direction trend has been detected at block 414 or no clear pattern period has been detected at block 416 and the total counter 314 value reaches a predetermined threshold value (the predetermined threshold value is a relatively high percentage of the number of cache lines in the block, i.e., of the number of bits of the block bitmask 302) indicating that most of the cache lines in the block have been accessed, the control logic 322 goes ahead and prefetches the remaining cache lines in the block.

Combined L2 Cache and L1D Cache Prefetcher

Modern microprocessors include a hierarchy of cache memories. Typically, a microprocessor includes a small and fast level-1 (L1) data cache and a larger but slower level-2 (L2) cache, such as the L1 data cache 116 and L2 cache 118 of FIG. 2, respectively. It is beneficial to prefetch data into the caches to improve cache hit rates. It is preferable to prefetch data into the L1 data cache since it is faster. However, because the L1 data cache is also small, its cache hit rate may actually be worsened by prefetching into it if it turns out the prefetcher was incorrect such that the data turns out to not be needed after all, thus replacing other data that was needed. Thus, the choice of whether to prefetch into the L1 data cache or the larger L2 cache is a function of the accuracy of the prefetcher to correctly predict which data will be needed. L1 data cache prefetchers tend to be small and therefore less accurate because they are constrained to the smaller dimensions of the L1 data cache; whereas, an L2 cache prefetcher can be relatively large and therefore more accurate because its size will likely be dwarfed by the size of the L2 cache tag and data arrays.

Embodiments of the microprocessor 100 described herein have the advantage that a single prefetch unit 134 serves as the basis for the prefetching needs of both the L2 cache 118 and the L1 data cache 116. The embodiments allow the accuracy of the L2 cache prefetcher 134 to be applied towards solving the problem of prefetching into the L1 data cache 116. Further, the embodiments accomplish the goal with a single body of logic that handles prefetches into both the L1 data cache 116 and the L2 cache 118.

Figure 12:
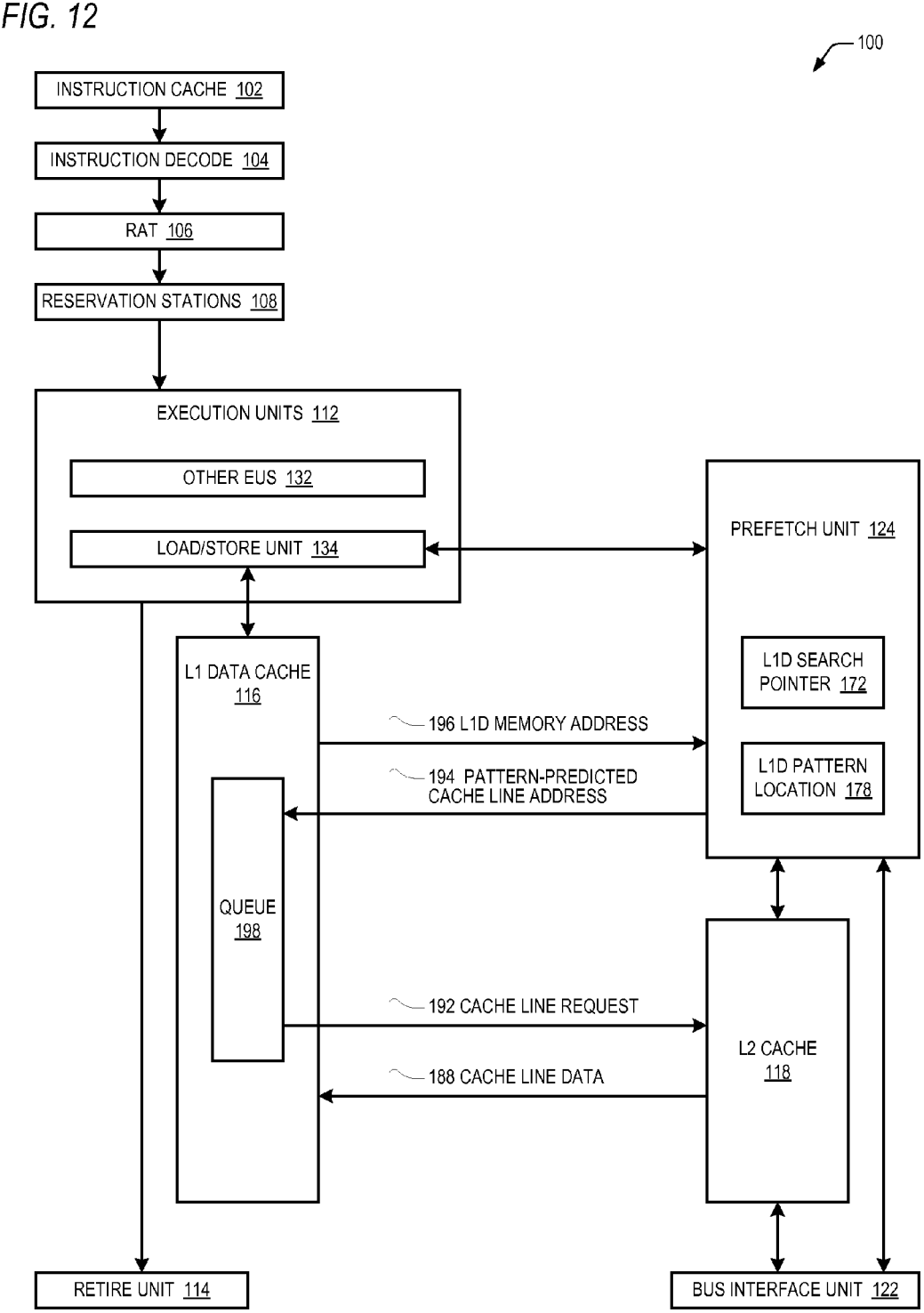
FIG. 12 is a block diagram illustrating a microprocessor according to an alternate embodiment of the present invention.

Referring now to FIG. 12, a block diagram illustrating a microprocessor 100 according to an alternate embodiment of the present invention is shown. The microprocessor 100 of FIG. 12 is similar to the microprocessor 100 of FIG. 2 and includes additional features which will now be described.

The L1 data cache 116 provides a L1D memory address 196 to the prefetch unit 124. The L1D memory address 196 is the physical address of a load/store access of the L1 data cache 116 by the load/store unit 134. That is, the prefetch unit 124 eavesdrops as the load/store unit 134 accesses the L1 data cache 116. The prefetch unit 124 provides a pattern-predicted cache line address 194 to a queue 198 of the L1 data cache 116, which is the address of a cache line that the prefetch unit 124 predicts the load/store unit 134 will soon request of the L1 data cache 116 based on the L1D memory address 196. The L1 data cache 116 provides a cache line request 192 to the prefetch unit 124 that requests cache lines from the L2 cache 118 cache whose addresses are stored in the queue 198. Finally, the L2 cache 118 provides to the L1 data cache 116 the requested cache line data 188.

The prefetch unit 124 also includes an L1D search pointer 172 and L1D pattern location 178, as shown in FIG. 12. The use of the L1D search pointer 172 and L1D pattern location 178 is described below with respect to FIG. 14.

Figure 13:
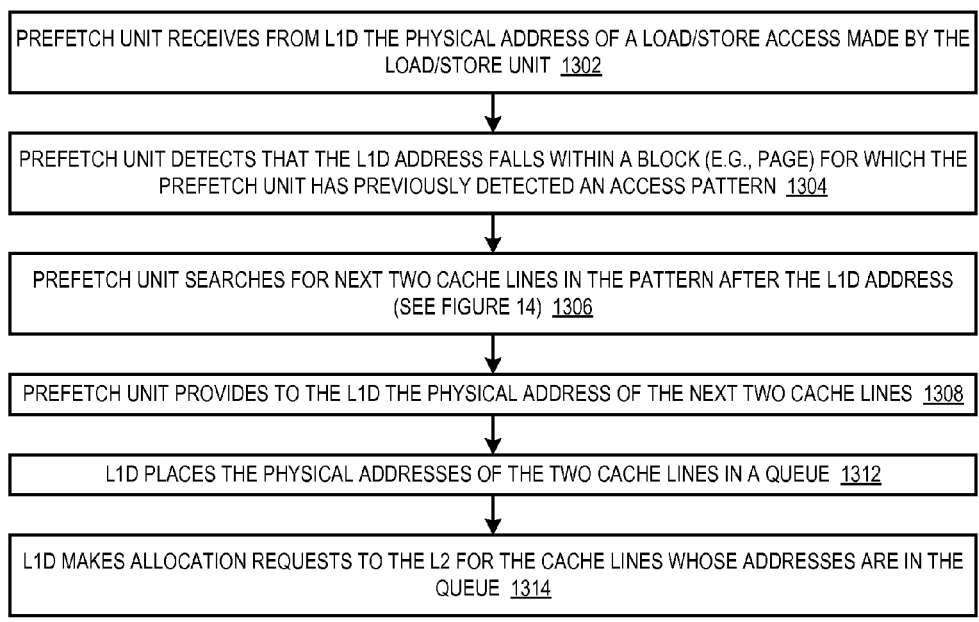
FIG. 13 is a flowchart illustrating operation of the prefetch unit of FIG. 12.

Referring now to FIG. 13, a flowchart illustrating operation of the prefetch unit 124 of FIG. 12 is shown. Flow begins at block 1302.

At block 1302, the prefetch unit 124 receives the L1D memory address 196 of FIG. 12 from the L1 data cache 116. Flow proceeds to block 1304.

At block 1304, the prefetch unit 124 detects that the L1D memory address 196 falls within a block (e.g., page) for which the prefetch unit 124 has previously detected an access pattern and has begun prefetching cache lines from system memory into the L2 cache 118, as described above with respect to FIGS. 1 through 11. Specifically, the prefetch unit 124 maintains a block number 303 that specifies the base address of the memory block for which the access pattern has been detected. The prefetch unit 124 detects that the L1D memory address 196 falls within the memory block by detecting that the bits of the block number 303 match the corresponding bits of the L1D memory address 196. Flow proceeds to block 1306.

At block 1306, beginning at the L1D memory address 196, the prefetch unit 124 finds the next two cache lines in the detected access direction within the memory block that are implicated by the previously detected access pattern. The operation performed at block 1306 is described in more detail below with respect to FIG. 14. Flow proceeds to block 1308.

At block 1308, the prefetch unit 124 provides to the L1 data cache 116 the physical addresses of the next two cache lines found at block 1306 as the pattern-predicted cache line address 194. Other embodiments are contemplated in which the number of cache line addresses provided by the prefetch unit 124 is more or less than two. Flow proceeds to block 1312.

At block 1312, the L1 data cache 116 pushes the addresses provided at block 1308 into the queue 198. Flow proceeds to block 1314.

At block 1314, whenever the queue 198 is non-empty, the L1 data cache 116 takes the next address out of the queue 198 and makes an allocation request 192 to the L2 cache 118 for the cache line at the address. However, if an address in the queue 198 is already present in the L1 data cache 116, the L1 data cache 116 dumps the address and foregoes requesting its cache line from the L2 cache 118. The L2 cache 118 subsequently provides the requested cache line data 188 to the L1 data cache 116. Flow ends at block 1314.

Figure 14:
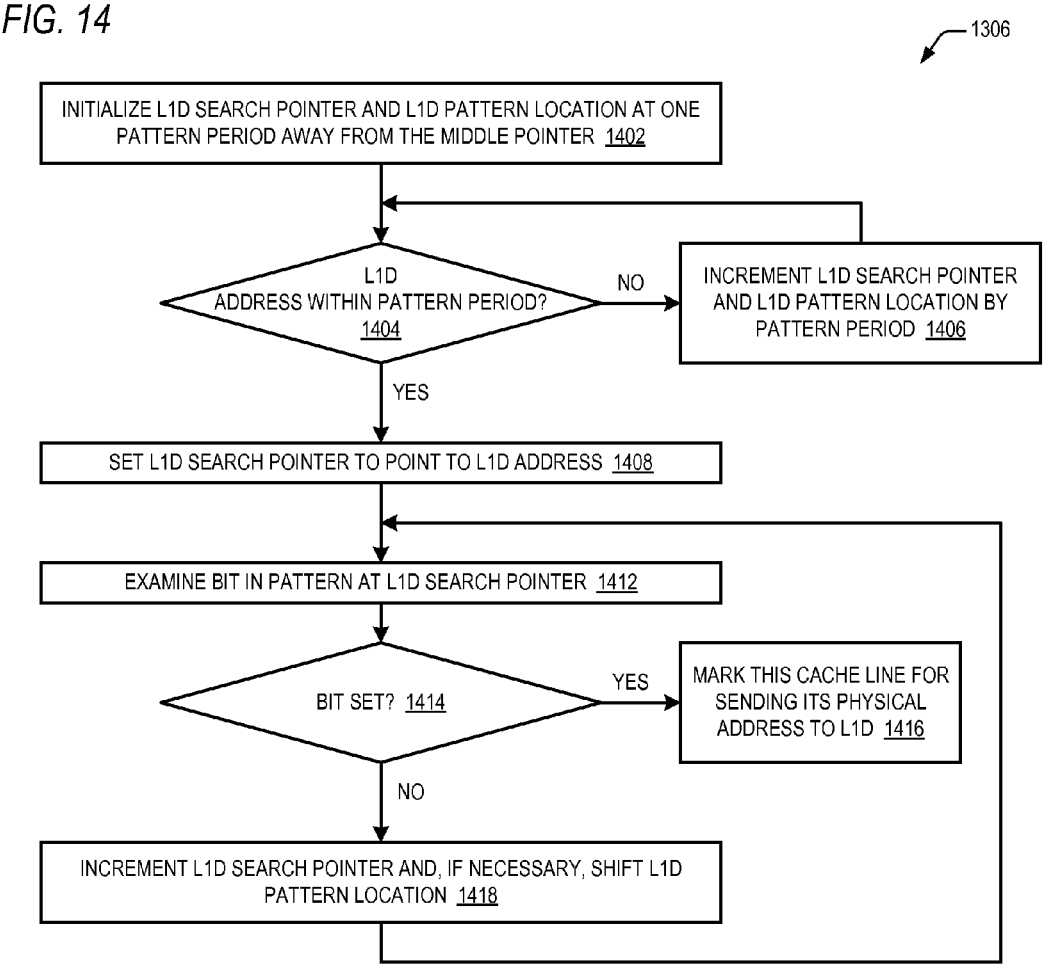
FIG. 14 is a flowchart illustrating operation of the prefetch unit of FIG. 12 according to block of FIG. 13.

Referring now to FIG. 14, a flowchart illustrating operation of the prefetch unit 124 of FIG. 12 according to block 1306 of FIG. 13 is shown. FIG. 14 describes the operation in the case that the detected direction 342 of the pattern of FIG. 3 is upward. However, the prefetch unit 124 is also configured to perform a similar function if the detected pattern direction is downward. The operation of blocks 1402 through 1408 are performed to essentially position the pattern 344 of FIG. 3 within the proper location within the memory block so that the prefetch unit 124 can search for the next two cache lines indicated by the pattern beginning at the L1D memory address 196 while replicating the pattern 344 over the memory block as far as necessary. Flow begins at block 1402.

At block 1402, the prefetch unit 124 initializes the L1D search pointer 172 and L1D pattern location 178 of FIG. 12 with the sum of the pattern period 346 and the middle pointer 316 of FIG. 3 similar to the manner in which the search pointer 352 and pattern location 348 are initialized at block 602 of FIG. 6. For example, if the middle pointer 316 value is 16 and the pattern period 346 is five and the direction 342 is upward, then the prefetch unit 124 initializes the L1D search pointer 172 and L1D pattern location 178 to 21. Flow proceeds to decision block 1404.

At decision block 1404, the prefetch unit 124 determines whether the L1D memory address 196 falls within the pattern 344 given its current location, which initially is determined according to block 1402 and which may be updated according to block 1406. That is, the prefetch unit 124 determines whether the value of the relevant bits of the L1D memory address 196 (i.e., excluding the bits that identify the memory block and the bits that specify the byte offset within the cache line) is greater than or equal to the value of the L1D search pointer 172 and less than or equal to the value of the sum of the L1D search pointer 172 and the value of the pattern period 346. If the L1D address 196 falls within the pattern 344, flow proceeds to block 1408; otherwise, flow proceeds to block 1406.

At block 1406, the prefetch unit 124 increments the L1D search pointer 172 and the L1D pattern location 178 by the pattern period 346. With respect to the operation at block 1406 (and at block 1418, described below), the search ends if the L1D search pointer 172 reaches the end of the memory block. Flow returns to block 1404.

At block 1408, the prefetch unit 124 sets the value of the L1D search pointer 172 to the offset within the memory page of the cache line implicated by the L1D memory address 196. Flow proceeds to block 1412.

At block 1412, the prefetch unit 124 examines the bit in the pattern 344 at the L1D search pointer 172. Flow proceeds to decision block 1414.

At decision block 1414, the prefetch unit 124 determines whether the bit examined at block 1412 is set. If so, flow proceeds to block 1416; otherwise, flow proceeds to block 1418.

At block 1416, the prefetch unit 124 marks the cache line predicted by the pattern 344 at block 1414 as ready to send its physical address to the L1 data cache 116 as a pattern-predicted cache line address 194. Flow ends at block 1416.

At block 1418, the prefetch unit 124 increments the L1D search pointer 172. Additionally, if the L1D search pointer 172 has passed beyond the last bit of the pattern 344, the prefetch unit 124 updates the L1D pattern location 178 with the new value of the L1D search pointer 172, i.e., shifts the pattern 344 to the new L1D search pointer 172 location. The operation of blocks 1412 through 1418 is performed repeatedly until two cache lines (or another predetermined number of cache lines) have been found. Flow ends at block 1418.

A benefit of the somewhat circuitous route described with respect to FIG. 13 for prefetching the cache lines into the L1 data cache 116 is that it requires relatively small changes to the L1 data cache 116 and L2 cache 118. However, other embodiments are contemplated in which the prefetch unit 124 does not provide the patter-predicted cache line addresses 194 to the L1 data cache 116. For example, in one embodiment, the prefetch unit 124 directly requests the bus interface unit 122 to obtain the cache lines from memory and then writes the received cache lines to the L1 data cache 116. In another embodiment, the prefetch unit 124 requests the cache lines from the L2 cache 118, which provides the data to the prefetch unit 124 (after obtaining the cache lines from memory if they are missing), and the prefetch unit 124 writes the received cache lines to the L1 data cache 116. In yet another embodiment, the prefetch unit 124 requests the cache lines from the L2 cache 118, which writes the cache lines directly to the L1 data cache 116 (after obtaining the cache lines from memory if they are missing).

Figures 20, 21:
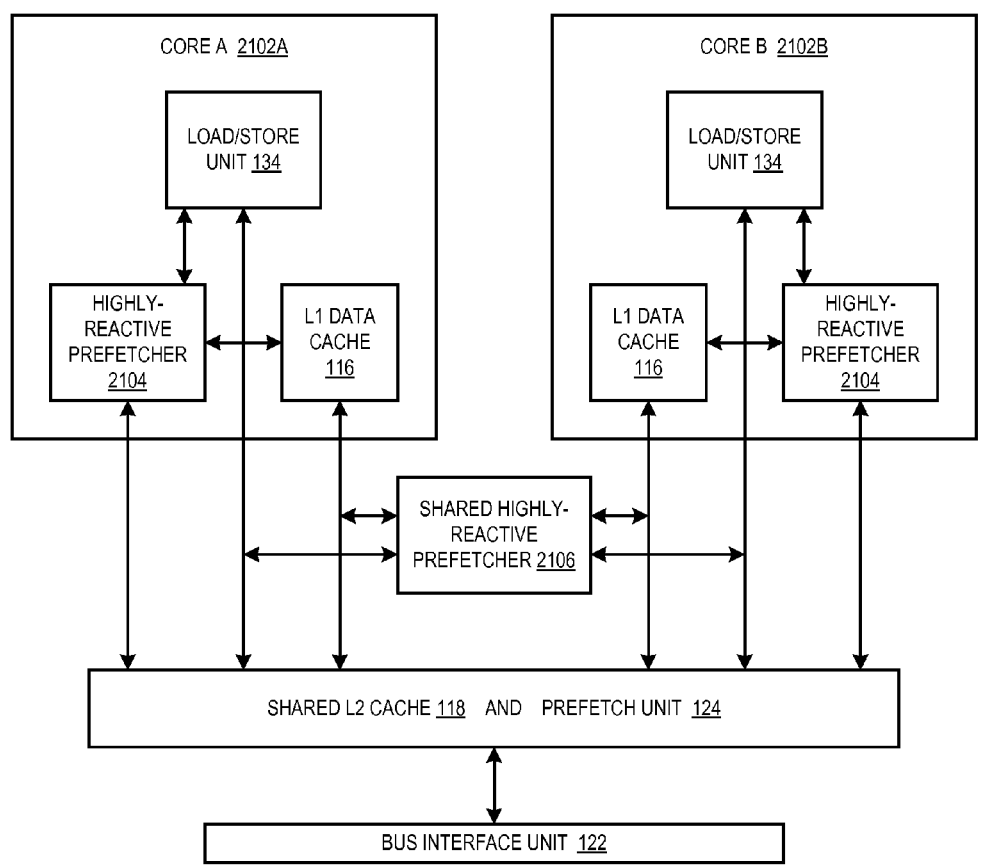
FIG. 20 is a block diagram illustrating a hashed physical address-to-hashed virtual address thesaurus for use in the prefetch unit of FIG. 15 according to an alternate embodiment of the present invention.
FIG. 21 is a block diagram illustrating a multi-core microprocessor according to the present invention.

As mentioned above, embodiments described herein have the advantage that a single prefetch unit 134 serves as the basis for the prefetching needs of both the L2 cache 118 and the L1 data cache 116. Although shown in FIGS. 2 and 12 and 15 (discussed below) as distinct blocks, the prefetch unit 124 may be spatially located adjacent to the L2 cache 118 tag and data arrays and considered conceptually as contained with the L2 cache 118, as shown in FIG. 21. The embodiments allow the accuracy of the prefetch unit 134, with its larger space budget, to be applied towards solving the problem of prefetching into the smaller L1 data cache 116 with a single body of logic that handles prefetches into both the L1 data cache 116 and the L2 cache 118.

Bounding Box Prefetcher with Reduced Warm-Up Penalty on Page Crossings

The bounding-box prefetch unit 124 described herein detects relatively more complex access patterns over a memory block (e.g., a physical memory page) that are unlikely to be detected by conventional prefetchers. For example, the bounding-box prefetcher 124 is likely to detect that a program is accessing a memory block according to a pattern even though the out-of-order execution pipeline of the microprocessor 100 may be re-ordering the memory accesses out of the program order, which is likely to cause a conventional prefetcher not to detect the memory access pattern and consequently not prefetch. This is because the bounding-box prefetcher 124 is configured to consider the accesses to a memory block effectively without respect to the time order in which the accesses are made.

However, the ability to recognize more complex and/or re-ordered access patterns may require a larger amount of time for the bounding-box prefetcher 124 to detect the access pattern than a more conventional prefetcher, referred to herein as a "warm-up time." Thus, what is needed is a way to reduce the warm-up time of the bounding box prefetcher 124.

Described herein are embodiments in which the bounding-box prefetcher 124 is configured to predict that a program that was accessing a memory block with an access pattern has crossed over to a new memory block to which the old memory block is virtually adjacent and to predict the program will continue to access the new memory block according to the same pattern. In response, the bounding-box prefetcher 124 uses the pattern, direction, and other relevant information from the old memory block to more quickly detect the pattern of accesses in the new memory block, i.e., to shorten the warm-up time.

Figure 15:
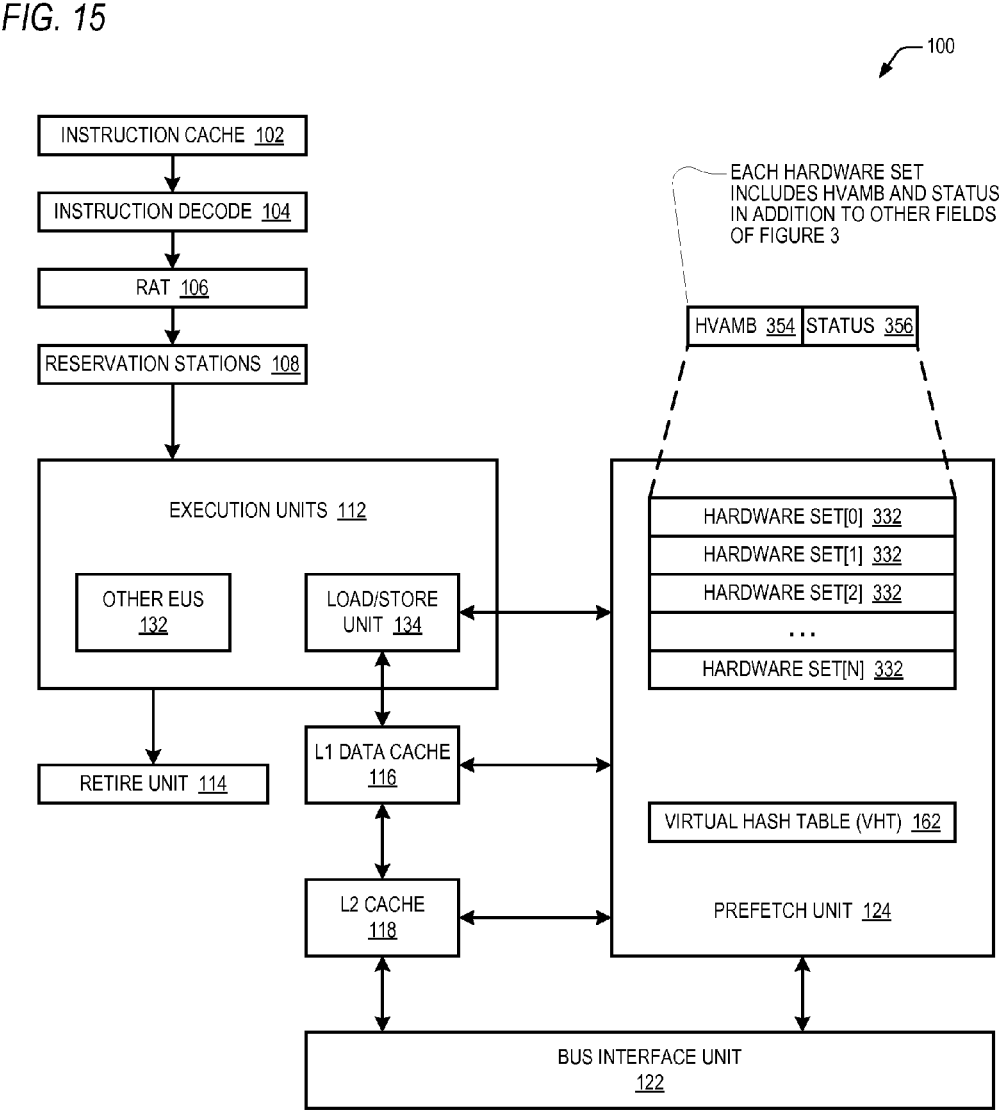
FIG. 15 is a block diagram illustrating a microprocessor having a bounding-box prefetch unit according to an alternate embodiment of the present invention.

Referring now to FIG. 15, a block diagram illustrating a microprocessor 100 having a bounding-box prefetch unit 124 according to an alternate embodiment of the present invention is shown. The microprocessor 100 of FIG. 15 is similar to the microprocessor 100 of FIGS. 2 and 12 and includes additional features which will now be described.

As described above with respect to FIG. 3, the prefetch unit 124 includes a plurality of hardware sets 332. Each hardware set 332 includes, in addition to the fields described in FIG. 3, a hashed virtual address of memory block (HVAMB) 354 field and a status 356 field. During the initialization of an allocated hardware set 332 as described above with respect to block 406 of FIG. 4, the prefetch unit 124 takes the physical block number 303, translates it back to its virtual address, hashes the virtual address according to the same hashing algorithm used to perform the operation at block 1704 of FIG. 17 described below, and stores the result of the hashing algorithm in the HVAMB 354 field. The status field 356 has three possible values: inactive, active, or probationary, as described below. The prefetch unit 124 also includes a virtual hash table (VHT) 162, whose organization and operation are described in more detail with respect to FIGS. 16 through 19 below.

Figure 16:
FIG. 16 is a block diagram illustrating the virtual hash table of FIG. 15.

Referring now to FIG. 16, a block diagram illustrating the virtual hash table 162 of FIG. 15 is shown. The virtual hash table 162 includes a plurality of entries, preferably organized as a queue. Each entry contains a valid bit (not shown) and three fields: a hash virtual address minus one (HVAM1) 1602, a hash virtual address unmodified (HVAUN) 1604, and a hash virtual address plus one (HVAP1) 1606. Generation of the values that populate these fields will be described with respect to FIG. 17.

Figure 17:
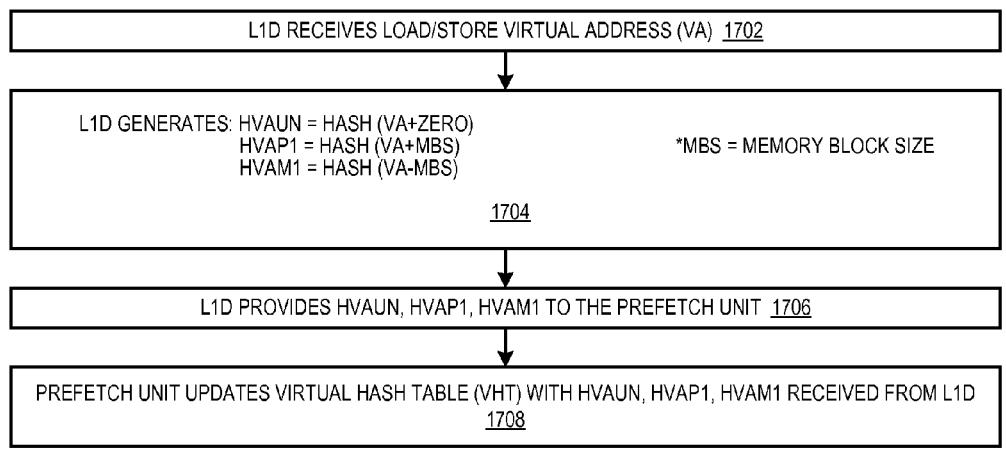
FIG. 17 is a flowchart illustrating operation of the microprocessor of FIG. 15.

Referring now to FIG. 17, a flowchart illustrating operation of the microprocessor 100 of FIG. 15 is shown. Flow begins at block 1702.

At block 1702, the L1 data cache 116 receives a load/store request from the load/store unit 134. The load/store request includes a virtual address. Flow proceeds to block 1704.

At block 1704, the L1 data cache 116 performs a hash function on selected bits of the virtual address received at block 1702 to generate a HVAUN. Additionally, the L1 data cache 116 adds the size of a memory block (MBS) to the selected bits of the virtual address received at block 1702 to generate a sum and then performs a hash function on the sum to generate a HVAP1. Additionally, the L1 data cache 116 subtracts the size of a memory block from the selected bits of the virtual address received at block 1702 to generate a difference and then performs a hash function on the difference to generate a HVAM1. In one embodiment, the memory block size is 4 KB. In one embodiment, the virtual address is 40 bits, and bits 39:30 and 11:0 of the virtual address are ignored by the hash function. The remaining 18 virtual address bits are "dealt," as in a hand of cards, across the bit positions of the hash. The idea is that lower bits of the virtual address have the highest entropy and higher bits the lowest entropy. Dealing them in this manner ensures that the entropy levels are relatively consistent across the bits of the hash. In one embodiment, the remaining 18 bits of the virtual address are hashed down to 6 bits according to the equations of Table 1 below. However, other embodiments are contemplated that employ different hash algorithms; additionally, embodiments are contemplated that do not employ a hashing algorithm if performance dominates space and power consumption as design concerns. Flow proceeds to block 1706.

TABLE 1 assign hash[5] = VA[29] ^ VA[18] ^ VA[17];
assign hash[4] = VA[28] ^ VA[19] ^ VA[16];
assign hash[3] = VA[27] ^ VA[20] ^ VA[15];
assign hash[2] = VA[26] ^ VA[21] ^ VA[14];
assign hash[1] = VA[25] ^ VA[22] ^ VA[13];
assign hash[0] = VA[24] ^ VA[23] ^ VA[12];

At block 1706, the L1 data cache 116 provides the HVAUN, HVAP1, and HVAM1 generated at block 1704 to the prefetch unit 124. Flow proceeds to block 1708.

At block 1708, the prefetch unit 124 selectively updates the virtual hash table 162 with the HVAUN, HVAP1, and HVAM1 received at block 1706. That is, if the virtual hash table 162 already includes an entry with the new HVAUN, HVAP1, and HVAM1, then the prefetch unit 124 foregoes updating the virtual hash table 162. Otherwise, the prefetch unit 124 pushes the HVAUN, HVAP1, and HVAM1 into the top entry of the virtual hash table 162 in a first-in-first-out fashion and marks the pushed entry valid. Flow ends at block 1708.

Figure 18:
FIG. 18 is illustrates the contents of the virtual hash table of FIG. 16 after operation of the prefetch unit according to its description in FIG. 17 by way of example.

FIG. 18 illustrates the contents of the virtual hash table 162 of FIG. 16 after operation of the prefetch unit 124 according to its description in FIG. 17 in an example in which the load/store unit 134, presumably in response to a program execution, has marched in an upward direction through two memory blocks (denoted A and A+MBS) and into a third (denoted A+2*MBS), in response to which the prefetch unit 124 has populated the virtual hash table 162 as shown. Specifically, the virtual hash table 162 entry that is two from the tail includes the hash of A−MBS in the HVAM1 field 1602, the hash of A in the HVAUN field 1604, and the hash of A+MBS in the HVAP1 field 1606; the virtual hash table 162 entry that is one from the tail includes the hash of A in the HVAM1 field 1602, the hash of A+MBS in the HVAUN field 1604, and the hash of A+2*MBS in the HVAP1 field 1606; and the virtual hash table 162 entry that is at the tail (i.e., the most recently pushed entry) includes the hash of A+MBS in the HVAM1 field 1602, the hash of A+2*MBS in the HVAUN field 1604, and the hash of A+3*MBS in the HVAP1 field 1606.

Figure 19A:
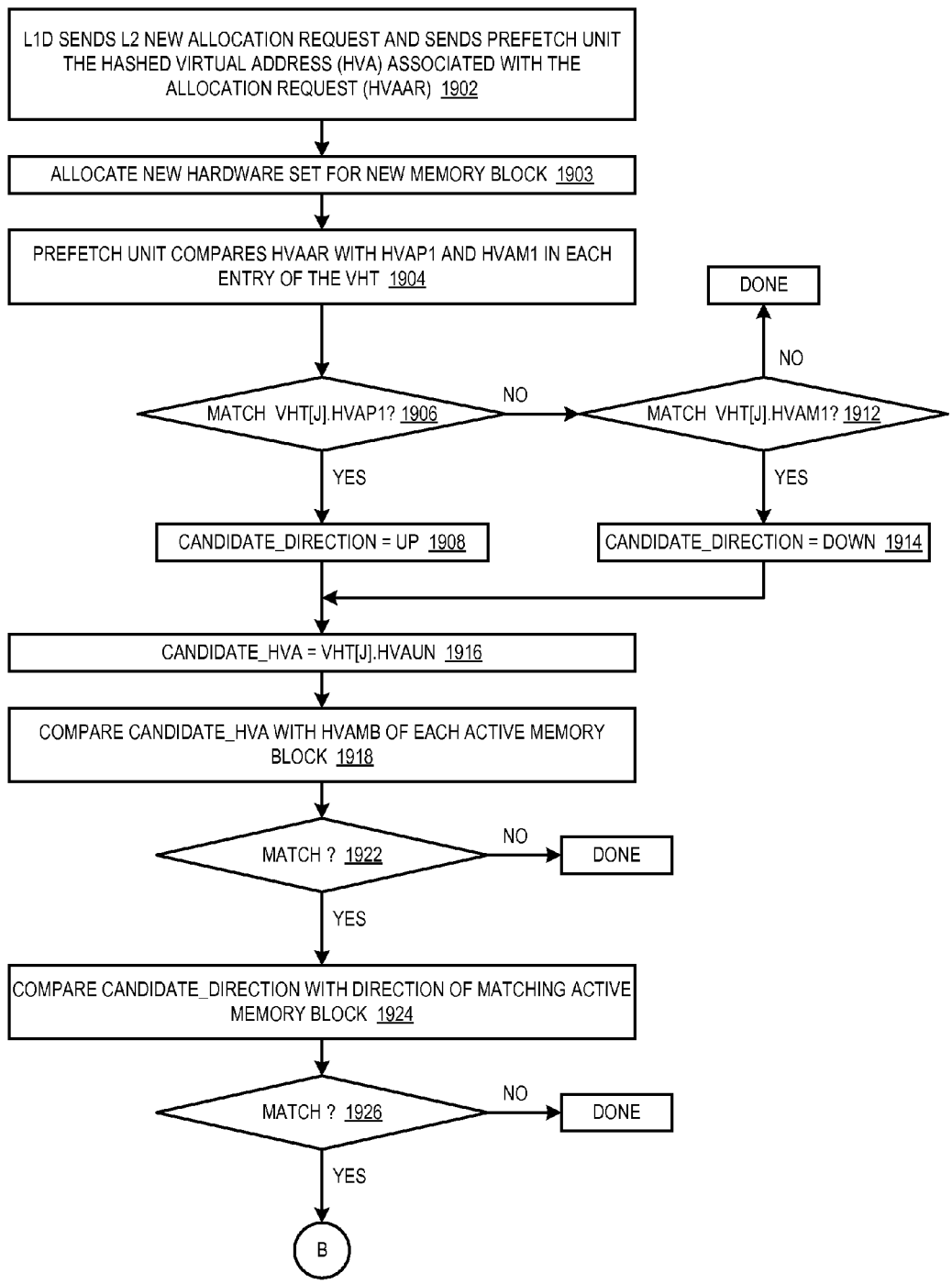
FIG. 19 (collectively FIGS. 19A and 19B) is a flowchart illustrating operation of the prefetch unit of FIG. 15.
Figure 19B:
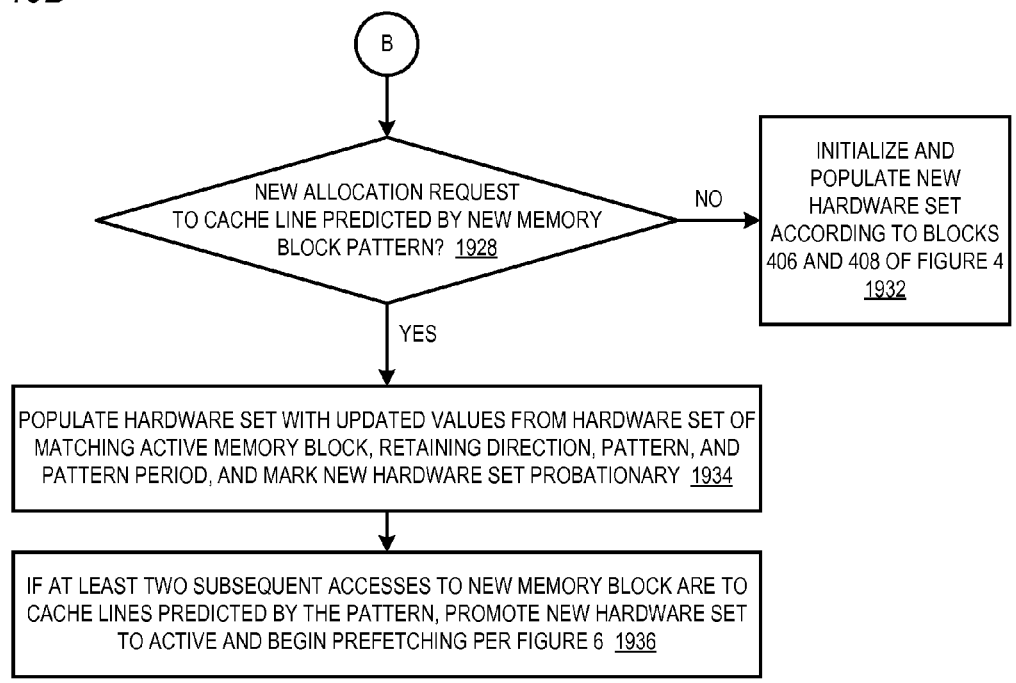

Referring now to FIG. 19 (collectively FIGS. 19A and 19B), a flowchart illustrating operation of the prefetch unit 124 of FIG. 15 is shown. Flow begins at block 1902.

At block 1902, the L1 data cache 116 sends to the L2 cache 118 a new allocation request (AR). The new allocation request is to a new memory block. That is, the prefetch unit 124 determines that the memory block implicated by the allocation request is new in the sense that there is not already a hardware set 332 allocated to the memory block implicated by the new allocation request. That is, the prefetch unit 124 has not recently encountered an allocation request within the new memory block. In one embodiment, the allocation request is a request that occurs as a result of a load/store missing the L1 data cache 116 and subsequently requesting the same cache line from the L2 cache 118. According to one embodiment, the allocation request specifies a physical address. There is a virtual address associated with the physical address from which the physical address was translated. The L1 data cache 116 hashes the virtual address associated with the physical address of the allocation request according to a hash function, namely the same hash function used at block 1704 of FIG. 17, to generate a hashed virtual address of the allocation request (HVAAR), and provides the HVAAR to the prefetch unit 124. Flow proceeds to block 1903.

At block 1903, the prefetch unit 124 allocates a new hardware set 332 for the new memory block. The prefetch unit 124 allocates an inactive hardware set 332 if one exists. Otherwise, in one embodiment, the prefetch unit 124 allocates the least-recently-used hardware set 332. In one embodiment, the prefetch unit 124 inactivates a hardware set 332 once the prefetch unit 124 has prefetched all the cache lines of the memory block indicated by the pattern. In one embodiment, the prefetch unit 124 has the ability to pin a hardware set 332 so that it is not replaced even though it becomes the least-recently-used hardware set 332. For example, if the prefetch unit 124 detects that a predetermined number of accesses have been made into the memory block according to the pattern but the prefetch unit 124 has not yet completed all prefetching for the entire memory block according to the pattern, then the prefetch unit 124 may pin the hardware set 332 associated with the memory block so that it is ineligible for replacement even though it becomes the least-recently-used hardware set 332. In one embodiment, the prefetch unit 124 maintains the relative age (from original allocation) of each hardware set 332, and the prefetch unit 124 inactivates a hardware set 332 if its age reaches a predetermined age threshold. In an alternate embodiment, the prefetch unit 124, rather than allocating a new hardware set 332, selectively re-uses the hardware set 332 from the virtually adjacent memory block if the prefetch unit 124 detects a virtually adjacent memory block (via blocks 1904 through 1926 below) and has finished prefetching from the virtually adjacent memory block. In this case, the prefetch unit 124 selectively initializes the various storage elements of the re-used hardware set 332 to maintain useful information stored therein, such as the direction 342, pattern 344, and pattern location 348. Flow proceeds to block 1904.

At block 1904, the prefetch unit 124 compares the HVAAR generated at block 1902 with the HVAM1 1602 and HVAP1 1606 of each entry of the virtual hash table 162. Operation of the prefetch unit 124 according to blocks 1904 through 1922 are for the purpose of determining that an already active memory block is virtually adjacent to the new memory block, and operation of the prefetch unit 124 according to blocks 1924 through 1928 are for the purpose of predicting that memory accesses will continue from the virtually adjacent already active memory block into the new memory block according to the previously detected access pattern and direction in order to reduce the warm-up time of the prefetch unit 124 for the new memory block so that the prefetch unit 124 can begin prefetching for the new memory block sooner that it otherwise would. Flow proceeds to decision block 1906.

At decision block 1906, the prefetch unit 124 determines whether there is a match of the HVAAR with any of the virtual hash table 162 entries based on the comparison performed at block 1904. If so, flow proceeds to block 1908; otherwise, flow proceeds to decision block 1912.

At block 1908, the prefetch unit 124 sets a candidate_direction flag to a value to indicate the up direction. Flow proceeds to block 1916.

At decision block 1912, the prefetch unit 124 determines whether there is a match of the HVAAR with any of the virtual hash table 162 entries based on the comparison performed at block 1908. If so, flow proceeds to block 1914; otherwise, flow ends.

At block 1914, the prefetch unit 124 sets the candidate_direction flag to a value to indicate the down direction. Flow proceeds to block 1916.

At block 1916, the prefetch unit 124 sets a candidate_hva register (not shown) to the value of the HVAUN field 1604 of the matching virtual hash table 162 entry found at either decision block 1906 or 1912. Flow proceeds to block 1918.

At block 1918, the prefetch unit 124 compares the candidate_hva with the HVAMB 354 of each active memory block within the prefetcher 136. Flow proceeds to decision block 1922.

At decision block 1922, the prefetch unit 124 determines whether there is a match of the candidate_hva with any of the HVAMB 354 based on the comparison performed at block 1918. If so, flow proceeds to block 1924; otherwise, flow ends.

At block 1924, the prefetch unit 124 has determined that the matching active memory block found at decision block 1922 is indeed virtually adjacent to the new memory block. Therefore, the prefetch unit 124 compares the candidate_direction (assigned at block 1908 or block 1914) with the direction 342 of the matching active memory block for use in predicting whether memory accesses will continue from the virtually adjacent already active memory block into the new memory block according to the previously detected access pattern and direction. Specifically, if the candidate_direction is not the same as the direction 342 of the virtually adjacent memory block, then it is unlikely that memory accesses will continue from the virtually adjacent already active memory block into the new memory block according to the previously detected access pattern and direction. Flow proceeds to decision block 1926.

At decision block 1926, the prefetch unit 124 determines whether there is a match between the candidate_direction and the direction 342 of the matching active memory block based on the comparison performed at block 1924. If so, flow proceeds to block decision 1928; otherwise, flow ends.

At decision block 1928, the prefetch unit 124 determines whether the new allocation request received at block 1902 is directed to a cache line predicted by the pattern 344 of the matching virtually adjacent active memory block detected at decision block 1926. In one embodiment, to make the determination at decision block 1928, the prefetch unit 124 effectively shifts and replicates the pattern 344 of the matching virtually adjacent active memory block according to its pattern period 346 continuing with the sequence from its pattern location 348 in the virtually adjacent memory block in order to maintain continuity of the pattern 344 into the new memory block. If the new allocation request is to a cache line predicted by the pattern 344 of the matching active memory block, flow proceeds to block 1934; otherwise, flow proceeds to block 1932.

At block 1932, the prefetch unit 124 initializes and populates the new hardware set 332 (allocated at block 1903) according to blocks 406 and 408 of FIG. 4 in hopes that it will be able to eventually detect a new pattern of accesses to the new memory block according to the method described above with respect to FIGS. 4 through 6, which require the warm-up time. Flow ends at block 1932.

At block 1934, the prefetch unit 124 predicts that it is likely accesses will continue into the new memory block according to the pattern 344 and direction 342 within the matching virtually adjacent active memory block. Therefore, the prefetch unit 124 populates the new hardware set 332 similar to the manner at block 1932, but with some differences. In particular, the prefetch unit 124 populates the direction 342, pattern 344, and pattern period 346 with the corresponding values from the hardware set 332 of the virtually adjacent memory block. Additionally, the new value of the pattern location 348 is determined by continuing to shift it in increments of the pattern period 346 until it crosses over into the new memory block in order to provide continuity of the pattern 344 into the new memory block, as discussed above with respect to block 1928. Furthermore, the status field 356 in the new hardware set 332 is assigned to mark the new hardware set 332 as probationary. Finally, the search pointer 352 is initialized to begin searching at the beginning of the memory block. Flow proceeds to block 1936.

At block 1936, the prefetch unit 124 continues to monitor accesses to the new memory block as they occur. If the prefetch unit 124 detects that at least a predetermined number of subsequent accesses to the new memory block are to cache lines predicted by the pattern 344, then the prefetch unit 124 promotes the status 356 of the hardware set 332 from probationary to active and then, as described with respect to FIG. 6, begins prefetching from the new memory block. In one embodiment, the predetermined number of accesses is two, although embodiments are contemplated in which the predetermined number is different. Flow ends at block 1936.

Referring now to FIG. 20, a block diagram illustrating a hashed physical address-to-hashed virtual address thesaurus 2002 for use in the prefetch unit 124 of FIG. 15 according to an alternate embodiment of the present invention is shown. The thesaurus 2002 comprises an array of entries. Each entry includes a physical address (PA) 2004 and a corresponding hashed virtual address (HVA) 2006. The HVA 2006 is the result of hashing the virtual address that was translated into the PA 2004. The prefetch unit 124 populates the thesaurus 2002 by eavesdropping on recent virtual/physical address pairs traversing the load/store unit 134 pipeline. According to the alternate embodiment, at block 1902 of FIG. 19, the L1 data cache 116 does not provide the HVAAR to the prefetch unit 124, but instead only provides the physical address associated with the allocation request. The prefetch unit 124 looks up the physical address in the thesaurus 2002 to find a matching PA 2004 and obtain the associated HVA 2006, which becomes the HVAAR used in the remainder of FIG. 19. Including the thesaurus 2002 in the prefetch unit 124 alleviates the need for the L1 data cache 116 to provide the hashed virtual address associated with the allocation request, thus simplifying the interface between the L1 data cache 116 and the prefetch unit 124.

In one embodiment, each entry of the thesaurus 2002 includes a hashed physical address, rather than the full PA 2004, and the prefetch unit 124 hashes the allocation request physical address received from the L1 data cache 116 into a hashed physical address which it looks up in the thesaurus 2002 to obtain the appropriate HVA 2006. This embodiment enables the thesaurus 2002 to be smaller, but requires additional time to hash the physical address.

Referring now to FIG. 21, a block diagram illustrating a multi-core microprocessor 100 according to the present invention is shown. The multi-core microprocessor 100 includes two cores, referred to collectively as cores 2102 (or singly core 2102), denoted core A 2102A and core B 2102B. Each core has elements similar to the single-core microprocessor 100 shown in FIG. 2, 12 or 15. Additionally, each core 2102 has a highly-reactive prefetcher 2104, such as discussed above. The two cores 2102 share the L2 cache 118 and prefetch unit 124. In particular, each core's 2012 L1 data cache 116, load/store unit 134, and highly-reactive prefetcher 2104 are coupled to the shared L2 cache 118 and prefetch unit 124. Additionally, a shared highly-reactive prefetcher 2106 is coupled to the shared L2 cache 118 and prefetch unit 124. In one embodiment, the highly-reactive prefetchers 2104/2106 simply prefetch the next adjacent cache line after the cache line implicated by a memory access.

The prefetch unit 124, in addition to monitoring the memory accesses of the load/store units 134 and L1 data caches 116, may also monitor memory accesses generated by the highly-reactive prefetchers 2104/2106 to use in making prefetch decisions. The prefetch unit 124 may monitor memory accesses from different combinations of the memory access sources to perform the different functions described herein. For example, the prefetch unit 124 may monitor a first combination of memory accesses to perform the function described with respect to FIGS. 2 through 11, may monitor a second combination of memory accesses to perform the function described with respect to FIGS. 12 through 14, and may monitor a third combination of memory accesses to perform the function described with respect to FIGS. 15 through 19. Embodiments are contemplated in which, particularly for timing reasons, it is difficult for the shared prefetch unit 124 to monitor the activity of each core's 2102 load/store unit 134; therefore, the shared prefetch unit 124 indirectly monitors the activity of the load/store units 134 via traffic generated by the L1 data caches 116 as a result of load/store misses therein.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
a first-level cache memory;
a second-level cache memory; and
a data prefetcher, configured to:
maintain a largest address and a smallest address, wherein the largest address specifies a highest address within a memory block of memory accesses presented to the second-level cache memory, wherein the smallest address specifies a lowest address within the memory block of the memory accesses;
maintain a count of changes to the largest address at a count of changes to the smallest address, wherein when the control logic changes the largest address the control logic updates the count of changes to the largest address, wherein when the control logic changes the smallest address the control logic updates the count of changes to the smallest address;
detect a predominant direction and pattern of the memory accesses presented to the second-level cache memory and prefetch cache lines into the second-level cache memory based on the predominant direction and pattern, wherein the predominant direction is detected on the counts;
receive from the first-level cache memory an address of a memory access received by the first-level cache memory, wherein the address implicates a cache line;
determine one or more cache lines indicated by the pattern beyond the implicated cache line in the predominant direction; and
cause the one or more cache lines to be prefetched into the first-level cache memory.

2. The microprocessor of claim 1,
wherein the memory block is a small subset of the range of memory accessible by the microprocessor;
wherein to determine one or more cache lines indicated by the pattern beyond the implicated cache line in the predominant direction, the data prefetcher is configured to:
place the pattern over the memory block such that the address is within the pattern; and
search from the address in the predominant direction until encountering a cache line indicated by the pattern.

3. The microprocessor of claim 2,
wherein the pattern comprises a period of cache lines;
wherein to place the pattern over the memory block such that the address is within the pattern, the data prefetcher is configured to shift the pattern over the memory block by the period.

4. The microprocessor of claim 2, wherein addresses of the memory accesses presented to the second-level cache memory within the memory block are non-monotonically increasing or decreasing as a function of time.

5. The microprocessor of claim 4, wherein the addresses of the memory accesses presented to the second-level cache memory within the memory block may be non-sequential.

6. The microprocessor of claim 1, further comprising:
a plurality of processing cores;
wherein the second-level cache memory and data prefetcher are shared by the plurality of processing cores;
wherein each of the plurality of processing cores includes a distinct instantiation of the first-level cache memory.

7. The microprocessor of claim 1, wherein to cause the one or more cache lines to be prefetched into the first-level cache memory, the data prefetcher is configured to provide addresses of the one or more cache lines to the first-level cache memory, wherein the first-level cache memory is configured to request the one or more cache lines from the second-level cache memory.

8. The microprocessor of claim 7, wherein the first-level cache memory comprises a queue for storing the addresses received from the data prefetcher.

9. The microprocessor of claim 1, wherein to cause the one or more cache lines to be prefetched into the first-level cache memory, the data prefetcher is configured to request the one or more cache lines from a memory bus interface unit of the microprocessor and to subsequently provide the requested one or more cache lines to the first-level cache memory.

10. The microprocessor of claim 1, wherein to cause the one or more cache lines to be prefetched into the first-level cache memory, the data prefetcher is configured to request the one or more cache lines from the second-level cache memory.

11. The microprocessor of claim 10, wherein the data prefetcher is configured to subsequently provide the requested one or more cache lines to the first-level cache memory.

12. The microprocessor of claim 10, wherein the second-level cache memory is configured to subsequently provide the requested one or more cache lines to the first-level cache memory.

13. The microprocessor of claim 1, wherein to detect the predominant pattern, the data prefetcher is configured to:
maintain, as the memory accesses are presented, a history of accessed cache lines implicated by the memory accesses within the memory block; and
detect the pattern based on the history.

14. The microprocessor of claim 13, wherein to detect the predominant direction based on the counts, the data prefetcher:
detects the predominant direction is upward when the difference between the count of changes to the largest address and the count of changes to the smallest address is greater than a predetermined amount; and
detects the predominant access direction is downward when the difference between the count of changes to the smallest address and the count of changes to the largest address is greater than the predetermined amount.

15. The microprocessor of claim 13,
wherein the history comprises a bitmask that indicates accessed cache lines implicated by the memory accesses within the memory block;
wherein the data prefetcher is further configured to:
compute a middle indicator among the memory accesses within the bitmask; and
for each of a plurality of distinct bit periods, increment a match counter associated with the bit period if the N bits of the bitmask to the right of the middle indicator match the N bits to the left of the middle indicator, wherein N is the number of bits in the bit period.

16. The microprocessor of claim 15, wherein to detect the predominant pattern based on the bitmask, the data prefetcher:

detects that the difference between the match counter associated with one of the plurality of distinct bit periods and the match counter associated with all the other plurality of distinct bit periods is greater than a predetermined amount; and detects the predominant access pattern is specified by the N bits of the bitmask to one side of the middle indicator, wherein N is the number of bits in the one of the plurality of distinct bit periods whose associated match counter has the difference between the match counter associated with all the other plurality of distinct bit periods greater than the predetermined amount.

17. A method for prefetching data into a first-level cache memory of a microprocessor also having a second-level cache memory, the method comprising:

maintaining a largest address and a smallest address, wherein the largest address specifies a highest address within a memory block of memory accesses presented to the second-level cache memory, wherein the smallest address specifies a lowest address within the memory block of the memory accesses;

maintaining a count of changes to the largest address and a count of changes to the smallest address, wherein when the control logic changes the largest address the control logic updates the count of changes to the largest address, wherein when the control logic changes the smallest address the control logic updates the count of changes to the smallest address;

detecting a predominant direction and pattern of the memory accesses presented to the second-level cache memory and prefetching cache lines into the second-level cache memory based on the predominant direction and pattern, wherein said detecting the predominant direction is based on the counts;

receiving from the first-level cache memory an address of a memory access received by the first-level cache memory, wherein the address implicates a cache line;

determining one or more cache lines indicated by the pattern beyond the implicated cache line in the predominant direction; and causing the one or more cache lines to be prefetched into the first-level cache memory.

18. The method of claim 17,
wherein the memory block is a small subset of the range of memory accessible by the microprocessor;
wherein said determining one or more cache lines indicated by the pattern beyond the implicated cache line in the predominant direction comprises:
placing the pattern over the memory block such that the address is within the pattern; and
searching from the address in the predominant direction until encountering a cache line indicated by the pattern.

19. The method of claim 18, wherein the pattern comprises a period of cache lines, wherein said placing the pattern over the memory block such that the address is within the pattern comprises shifting the pattern over the memory block by the period.

20. The method of claim 18, wherein addresses of the memory accesses presented to the second-level cache memory within the memory block are non-monotonically increasing or decreasing as a function of time.

21. The method of claim 20, wherein the addresses of the memory accesses presented to the second-level cache memory within the memory block may be non-sequential.

22. The method of claim 17, wherein the microprocessor also includes a plurality of processing cores, wherein the second-level cache memory and data prefetcher are shared by the plurality of processing cores, wherein each of the plurality of processing cores includes a distinct instantiation of the first-level cache memory.

23. The method of claim 17, wherein said causing the one or more cache lines to be prefetched into the first-level cache memory comprises a data prefetcher of the microprocessor providing addresses of the one or more cache lines to the first-level cache memory, wherein the first-level cache memory subsequently requests the one or more cache lines from the second-level cache memory.

24. The method of claim 17, wherein said causing the one or more cache lines to be prefetched into the first-level cache memory comprises a data prefetcher of the microprocessor requesting the one or more cache lines from a memory bus interface unit of the microprocessor and subsequently providing the requested one or more cache lines to the first-level cache memory.

25. The method of claim 17, wherein said causing the one or more cache lines to be prefetched into the first-level cache memory comprises a data prefetcher of the microprocessor requesting the one or more cache lines from the second-level cache memory.

26. The method of claim 25, wherein said causing the one or more cache lines to be prefetched into the first-level cache memory further comprises the data prefetcher subsequently providing the requested one or more cache lines to the first-level cache memory.

27. The method of claim 25, wherein said causing the one or more cache lines to be prefetched into the first-level cache memory further comprises the second-level cache memory subsequently providing the requested one or more cache lines to the first-level cache memory.

28. A computer program product encoded in at least one non-transitory computer readable medium for use with a computing device, the computer program product comprising:

computer readable program code embodied in said medium, for specifying a microprocessor, the computer readable program code comprising:
first program code for specifying a first-level cache memory;
second program code for specifying a second-level cache memory; and
third program code for specifying a data prefetcher, configured to:
maintain a largest address and a smallest address, wherein the largest address specifies a highest address within a memory block of memory accesses presented to the second-level cache memory, wherein the smallest address specifies a lowest address within the memory block of the memory accesses;
maintain a count of changes to the largest address and a count of changes to the smallest address, wherein when the control logic changes the largest address the control logic updates the count of changes to largest dress, wherein when the control logic changes the smallest address the control logic updates the count of changes to the smallest address;
detect a predominant direction and pattern of the memory accesses presented to the second-level cache memory and prefetch cache lines into the second-level cache memory based on the predominant direction and pattern, wherein the predominant direction is detected based on the counts;

receive from the first-level cache memory an address of a memory access received by the first-level cache memory, wherein the address implicates a cache line;

determine one or more cache lines indicated by the pattern beyond the implicated cache line in the predominant direction; and cause the one or more cache lines to be prefetched into the first-level cache memory.

29. The computer program product of claim 28, wherein the at least one computer readable medium is selected from the set of a disk, tape, or other magnetic, optical, or electronic storage medium and a wire line.

\* \* \* \* \*

UNITED STATES PATENT AND TRADEMARK OFFICE
CERTIFICATE OF CORRECTION

PATENT NO. : 8,645,631 B2  Page 1 of 1
APPLICATION NO. : 13/033809
DATED : February 4, 2014
INVENTOR(S) : Hooker et al.

It is certified that error appears in the above-identified patent and that said Letters Patent is hereby corrected as shown below:

In the Claims in claim 1, column 21, line 34: insert --based-- after "detected" and before "on"

Signed and Sealed this
Twenty-first Day of October, 2014

Michelle K. Lee
*Deputy Director of the United States Patent and Trademark Office*